United States Patent
Naqvi et al.

(10) Patent No.: US 6,625,449 B1
(45) Date of Patent: Sep. 23, 2003

(54) SYSTEM AND METHOD OF SIPHONING MESSAGES FROM A MOBILE NETWORK TO AN ALTERNATIVE NETWORK

(75) Inventors: Shamim A. Naqvi, Boston, MA (US); Kumar K. Vishwanathan, Windham, NH (US); Rangamani Sundar, Windham, NH (US); Murali Aravamudan, Windham, NH (US)

(73) Assignee: Winphoria Netwroks, Inc., Tewksbury, MA (US)

( * ) Notice: Subject to any disclaimer, the term of this patent is extended or adjusted under 35 U.S.C. 154(b) by 449 days.

(21) Appl. No.: 09/721,564

(22) Filed: Nov. 22, 2000

(51) Int. Cl.$^7$ .................................................. H04Q 7/20
(52) U.S. Cl. ...................... 455/428; 455/560; 455/432; 455/433; 455/435; 455/436; 370/237; 370/354; 370/356
(58) Field of Search ................................. 455/428, 560, 455/433, 432, 435, 436, 414, 352; 370/237, 354, 356

(56) References Cited

U.S. PATENT DOCUMENTS

| | | | |
|---|---|---|---|
| 5,708,657 A | | 1/1998 | Hong et al. |
| 6,389,008 B1 | * | 5/2002 | Lupien et al. ............... 370/352 |
| 6,463,055 B1 | * | 10/2002 | Lupien et al. ............... 370/353 |
| 6,487,406 B1 | * | 11/2002 | Chang et al. ............. 455/422.1 |
| 6,490,451 B1 | * | 12/2002 | Denman et al. ............ 455/436 |
| 6,507,577 B1 | * | 1/2003 | Mauger et al. ............. 370/356 |

FOREIGN PATENT DOCUMENTS

| | | |
|---|---|---|
| EP | 0435448 | 7/1991 |
| EP | 0 888 022 | 12/1998 |
| EP | 1049339 | 2/2000 |

(List continued on next page.)

OTHER PUBLICATIONS

Hamalainen, J., et al., "Connection–less packet data transmission in the signaling network infrastructure", Universal Personal Communications, 1994. Record, 1994 Third Annual International Conference on San Diego, CA Sep. 27–Oct. 1, 1994, New York, NY, IEEE, Sep. 27, 1994, pp. 511–515.

Network Working Group: "SS7 MTP2–User Peer–to–Peer Adaptation Layer", Internet–Draft, Online!, May 22, 2000.

*Primary Examiner*—Vivian Chin
*Assistant Examiner*—Marceau Milord
(74) *Attorney, Agent, or Firm*—Hale and Dorr LLP

(57) ABSTRACT

A proxy switch, communication methods, and communication logic for use in a mobile network are described. A proxy switch is deployed between a base station subsystem and a mobile station center. It receives signaling messages and either retransmits them, blocks them, converts them, or siphons them to an alternative network. Besides providing an ability to offload mobile traffic it provides a platform for new communication services. A proxy switch includes signaling message handling logic for sending and receiving signaling messages to and from the MSC on a first signaling link and sending and receiving messages to and from the BS on a second signaling link; wherein the second link has a mapped correspondence to the first link. Message interception logic detects whether a signaling message from an MSC is a COO, indicating that the MSC will not receive signaling messages on the first signaling link. The message interception logic also prevents the COO from being forwarded to the BS and generates and sends a change over acknowledge (COA) message to the MSC. Signaling message redirection logic receives signaling messages on the second signaling link and provides control information contained therein to the alternative communication network after the message interception logic detects the COO; and bearer circuit redirection logic receives information from a bearer circuit corresponding to the second signaling link and directs the information to the alternative communication network.

5 Claims, 15 Drawing Sheets

FOREIGN PATENT DOCUMENTS

| | | | |
|---|---|---|---|
| EP | 1049339 A2 * | 11/2000 | ............ H04Q/7/22 |
| WO | 93/11625 | 6/1993 | |
| WO | 98/02011 | 1/1998 | |
| WO | WO 98/17076 | 4/1998 | |
| WO | 98/23123 | 5/1998 | |
| WO | 98/37721 | 8/1998 | |
| WO | 99/16272 | 4/1999 | |
| WO | 00/28714 | 5/2000 | |
| WO | 00/36869 | 6/2000 | |

* cited by examiner

SYSTEM AND METHOD OF SIPHONING MESSAGES FROM A MOBILE NETWORK TO AN ALTERNATIVE NETWORK

CROSS-REFERENCE TO RELATED APPLICATIONS

This application is related to the following applications, all of which are filed on the same date that this application is filed, all of which are assigned to the assignee of this application, and all of which are incorporated by reference in their entirety:

System and Method of Servicing Mobile Communications with a Proxy Switch (U.S. patent application Ser. No. 09721329

System and Method of Mobility Management in a Mobile Communications Network Having a Proxy Switch (U.S. patent application Ser. No. 09721327

System and Method of Managing Supplementary Features in the Presence of a Proxy Switch in a Mobile Communications Network (U.S. patent application Ser. No. 09721332

System and Method of Fault Management in a Mobile Communications Network Having a Proxy Switch (U.S. patent application Ser. No. 09721331

System and Method of Preserving Point Codes in a Mobile Network Having a Proxy Switch (U.S. patent application Ser. No. 09721563

BACKGROUND OF THE INVENTION

1. Field of the Invention

This invention relates to mobile communications and, more particularly, to the use of a proxy switch in a mobile communication network to improve capacity and cost-effectiveness of the communications network and to offer a platform for new mobile services.

2. Discussion of Related Art

All modern mobile communication systems have a hierarchical arrangement, in which a geographical "coverage area" is partitioned into a number of smaller geographical areas called "cells." Referring to FIG. 1, each cell is preferably served by a Base Transceiver Station (BTS) 102a. Several BTS 102b–n are aggregated via fixed links 104a–n into a Base Station Controller (BSC) 106a. The BTSs and BSC are sometimes collectively referred to as the Base Station Subsystem (BS) 107. Several BSCs 106b–n may be aggregated into a Mobile Switching Center (MSC) 110 via fixed links 108a–n.

The MSC 110 acts as a local switching exchange (with additional features to handle mobility management requirement, discussed below) and communicates with the phone network (PSTN) 120 through trunk groups. Under U.S. mobile networks, there is a concept of a home MSC and a Gateway MSC. The home MSC is the MSC corresponding to the exchange associated with a Mobile Station (MS); this association is based on the phone number, e.g., area code, of the MS. (The home MSC is responsible for the HLR discussed below). The Gateway MSC, on the other hand, is the exchange used to connect the MS call to the PSTN. Consequently, some times the home MSC and the Gateway MSC are the same entity, but other times they are not (e.g., when the MS is roaming). Typically, a Visiting Location Register (VLR) 116 is co-located with the MSC 110 and a logically singular HLR is used in the mobile network. As will be explained below, the HLR and VLR are used for storing many types of subscriber information and profiles.

Briefly, a number of radio channels 112 are associated with the entire coverage area. The radio channels are partitioned into groups of channels allocated to individual cells. The channels are used to carry signaling information to establish call connections and the like, and to carry voice or data information once a call connection is established.

At a relatively high level of abstraction, mobile network signaling involves at least two main aspects. One aspect involves the signaling between an MS and the rest of the network. With 2G ("2G" is the industry term used for "second generation") and later technology, this signaling concerns access methods used by the MS (e.g., time-division multiple access, or TDMA; code-division multiple access, or CDMA), assignment of radio channels, authentication, etc. A second aspect involves the signaling among the various entities in the mobile network, such as the signaling among MSCs, VLRs, HLRs, etc. This second part is sometimes referred to as the Mobile Application Part (MAP) especially when used in the context of Signaling System No. 7 (SS7).

The various forms of signaling (as well as the data and voice communication) are transmitted and received in accordance with various standards. For example, the Electronics Industries Association (EIA) and Telecommunications Industry Association (TIA) help define many U.S. standards, such as IS-41, which is a MAP standard. Analogously, the CCITT and ITU help define international standards, such as GSM-MAP, which is an international MAP standard. Information about these standards is well known and may be found from the relevant organizing bodies as well as in the literature, see, e.g., Bosse, SIGNALING IN TELECOMMUNICATIONS NETWORKS (Wiley 1998).

To deliver a call from an MS 114, a user dials the number and presses "send" on a cell phone or other MS. The MS 114 sends the dialed number indicating the service requested to the MSC 110 via the BS 107. The MSC 110 checks with an associated VLR 116 (more below) to determine if the MS 114 is allowed the requested service. The Gateway MSC routes the call to the local exchange of the dialed user on the PSTN 120. The local exchange alerts the called user terminal, and an answer back signal is routed back to the MS 114 through the serving MSC 110 which then completes the speech path to the MS. Once the setup is completed the call may proceed.

To deliver a call to a MS 114, (assuming that the call originates from the PSTN 120) the FPSTN user dials the MS's associated phone number. At least according to U.S. standards, the PSTN 120 routes the call to the MS's home MSC (which may or may not be the one serving the MS). The MSC then interrogates the HLR 118 to determine which MSC is currently serving the MS. This also acts to inform the serving MSC that a call is forthcoming. The home MSC then routes the call to the serving MSC. The serving MSC pages the MS via the appropriate BS. The MS responds and the appropriate signaling links are setup.

During a call, the BS 107 and MS 114 may cooperate to change channels or BTSs 102, if needed, for example, because of signal conditions. These changes are known as "handoffs," and they involve their own types of known messages and signaling.

One aspect of MAP involves "mobility management." Briefly, different BSs and MSCs may be needed and used to serve an MS, as the MS 114 roams to different locations. Mobility management ensures that the Gateway MSC has the subscriber profile and other information the MSC needs to service (and bill) calls correctly. To this end, MSCs use a Visiting Location Register (VLR) 116 and a Home Location Register (HLR) 118. The HLR is used to store and retrieve the mobile identification number (MIN), the electronic serial number (ESN), MS status, and the MS service profile, among other things. The VLR stores similar information in addition to storing an MSC identification that identifies the Gateway MSC. In addition, under appropriate MAP protocols, location update procedures (or registration notifications) are performed so that the home MSC of a mobile subscriber knows the location of its users. These procedures are used when a MS roams from one location to another or when a MS is powered on and registers itself to access the network. For example a location update procedure may proceed with the MS 114 sending a location update request to the VLR 116 via the BS 107 and MSC 110. The VLR 116 sends a location update message to the HLR 118 serving the MS 114, and the subscriber profile is downloaded from the HLR 118 to the VLR 116. The MS 114 is sent an acknowledgement of a successful location update. The HLR 118 requests the VLR,(if any) that previously held profile data to delete the data related to the relocated MS 114.

FIG. 2 shows in more detail the signaling and user traffic interfaces between a BS 107 and an MSC 110 in a CDMA mobile network. The BS 107 communicates signaling information using the Al interface. The A2 interface carries the user traffic (e.g., voice signals) between the switch component 204 of the MSC and the BS 107. The A5 interface is used to provide a path for user traffic for circuit-switched data calls (as opposed to voice calls) between the source BS and the MSC.

As the number of cell sites or the number of subscribers grows, the load on the MSC 110 increases. This increased load forces the service provider to add more capacity to the system. Typically, to add more capacity, the service provider adds more switch modules to the MSC or deploys additional MSCs in the network. Either alternative involves significant cost.

Moreover, subscribers are demanding newer services, e.g., "data calls" to the Internet. For some of these services MSCs are not cost effective because they were primarily designed for voice calls. Integration of new services into the MSC is complicated or infeasible because of the proprietary and closed designs used by many MSC software architectures. That is, the software logic necessary to provide the services is not easy to add to the MSC 110. Often, a switch adjunct is used to provide such services. For example, an Inter-Working Function (IWF) is an adjunct to route a data call to the Internet. Either approach—integrating functionality into the MSC or adding a trunk-side adjunct—involves the MSC in the delivery of service. Since the new service is expected to spur demand, integrating new services via MSC design changes or through trunk-side adjuncts is likely to exacerbate network congestion at the MSC and require costly MSC resources.

SUMMARY

The invention provides systems and methods of mobile communication. In particular, switching operations are performed between at least one mobile switching center (MSC) and at least one base station subsystem (BS). The switching, according to one aspect of the invention, allows communication traffic to be siphoned to or from an alternative network. According to one aspect of the invention, logic at the switching site interprets messages to infer when siphoning should occur.

Under one aspect of the invention, communications are redirected to an alternative communications network from a mobile communications network having at least one BS, at least one MS, at least one MSC, and at least one switch. The switch sends and receives signaling messages to and from the MSC on a first signaling link and sends and receives messages to and from the BS on a second signaling link; wherein the second link has a mapped correspondence to the first link. The switch detects whether a received message is a change over order message (COO) from the MSC, indicating that the MSC will not receive signaling messages on the first signaling link, and the switch generates and sends a change over acknowledge (COA) message to the MSC. After the act of detecting the COO, the switch receives signaling messages on the second signaling link and provides control information contained therein to the alternative communication network. In addition, after the act of detecting the COO, the switch receives information from a bearer circuit corresponding to the second signaling link and directs the information to the alternative communication network.

Under another aspect of the invention, a proxy switch includes signaling message handling logic for sending and receiving signaling messages to and from the MSC on a first signaling link and sending and receiving messages to and from the BS on a second signaling link; wherein the second link has a mapped correspondence to the first link. Message interception logic detects whether a signaling message from an MSC is a COO, indicating that the MSC will not receive signaling messages on the first signaling link. The message interception logic also prevents the COO from being forwarded to the BS and generates and sends a change over acknowledge (COA) message to the MSC. Signaling message redirection logic receives signaling messages on the second signaling link and provides control information contained therein to the alternative communication network after the message interception logic detects the COO; and bearer circuit redirection logic receives information from a bearer circuit corresponding to the second signaling link and directs the information to the alternative communication network.

DETAILED DESCRIPTION

Preferred embodiments of the invention provide a proxy switch and a method of use thereof in a mobile communications network. The proxy switch is preferably positioned between an MSC and a BS, "transparent" to the other components, meaning that neither the BS or the MSC needs to know of the proxy switch nor do they need to alter their behavior or functionality because of the existence of the proxy switch. Instead, the BS and MSC operate as they do conventionally, ignorant of the existence of the proxy switch.

Among its many advantages, the proxy switch may help alleviate congestion in a mobile network. For example, the proxy switch may be used (a) to siphon MS-originated communication traffic off the network before it gets to an MSC and (b) to send the siphoned traffic to the desired destination via an alternative network, such as a-packet-based network. Similarly, the proxy switch may be used to deliver communications to an MS from an alternative network. Consequently, costly MSC and PSTN resources may be avoided, and the proxy switch may be used to increase network capacity cost effectively.

In addition, the proxy switch defines a set of enabling functions that allow new communication services to be provided to the network. For example, using the proxy switch, new call waiting services may be integrated into the mobile network.

Figure 1:
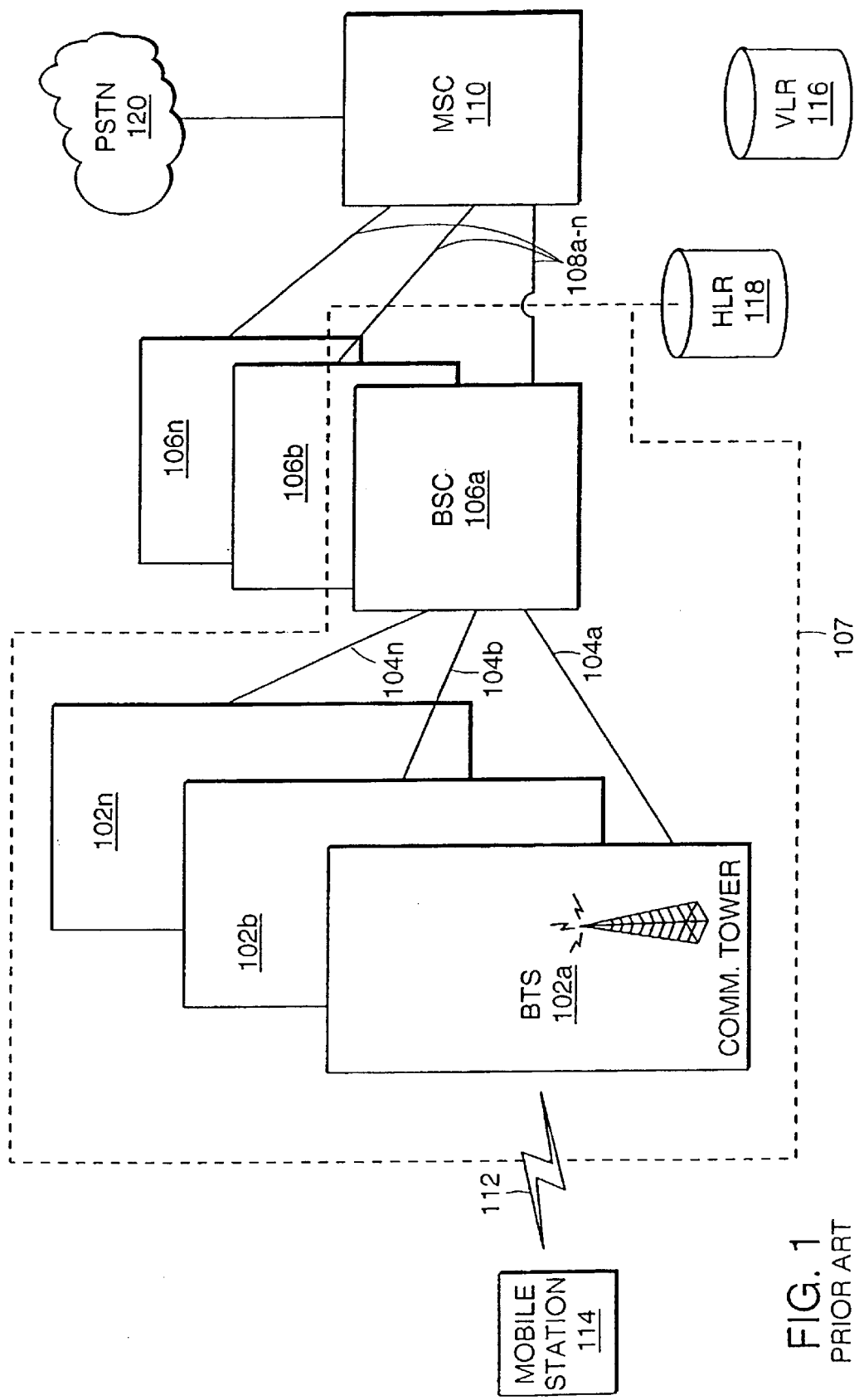
FIG. 1 is a system diagram of prior art mobile networks.
Figure 2:
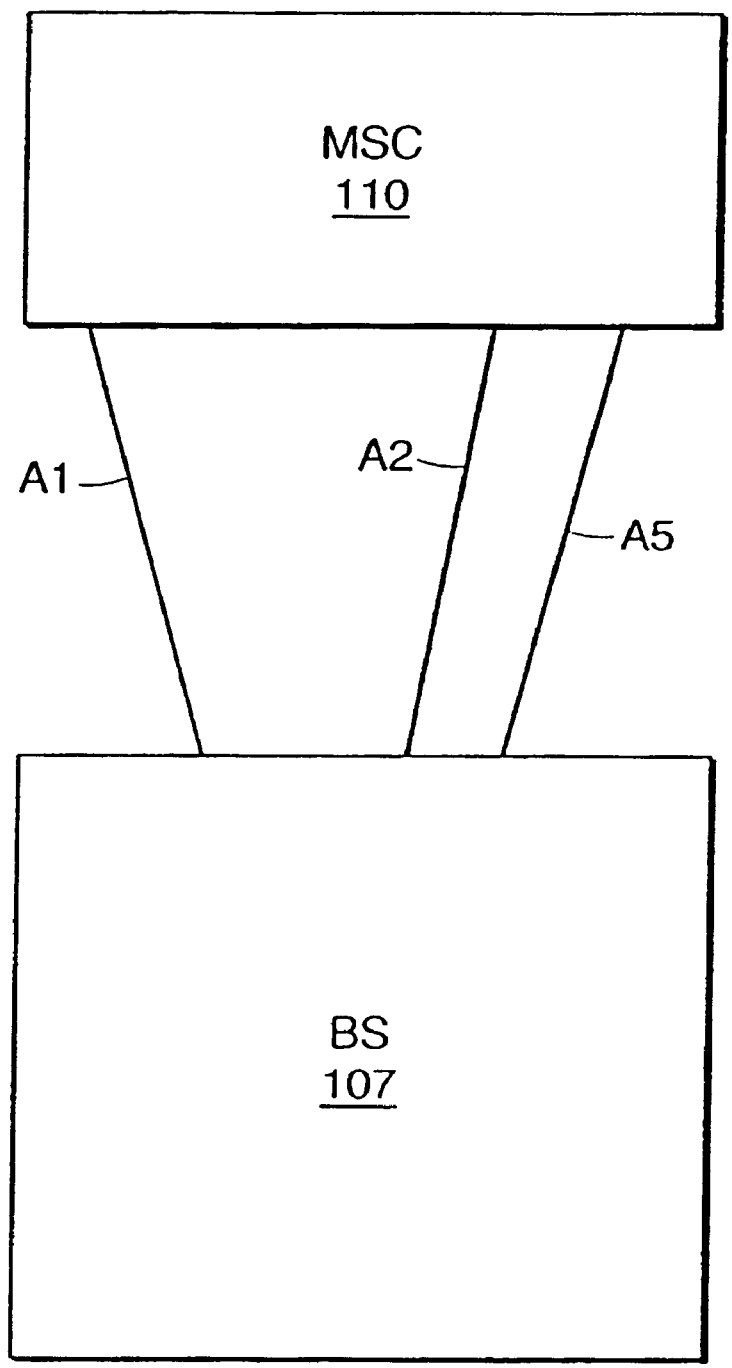
FIG. 2 illustrates a prior art interface between a BS and a mobile switching center in a prior art mobile network.
Figure 3A:
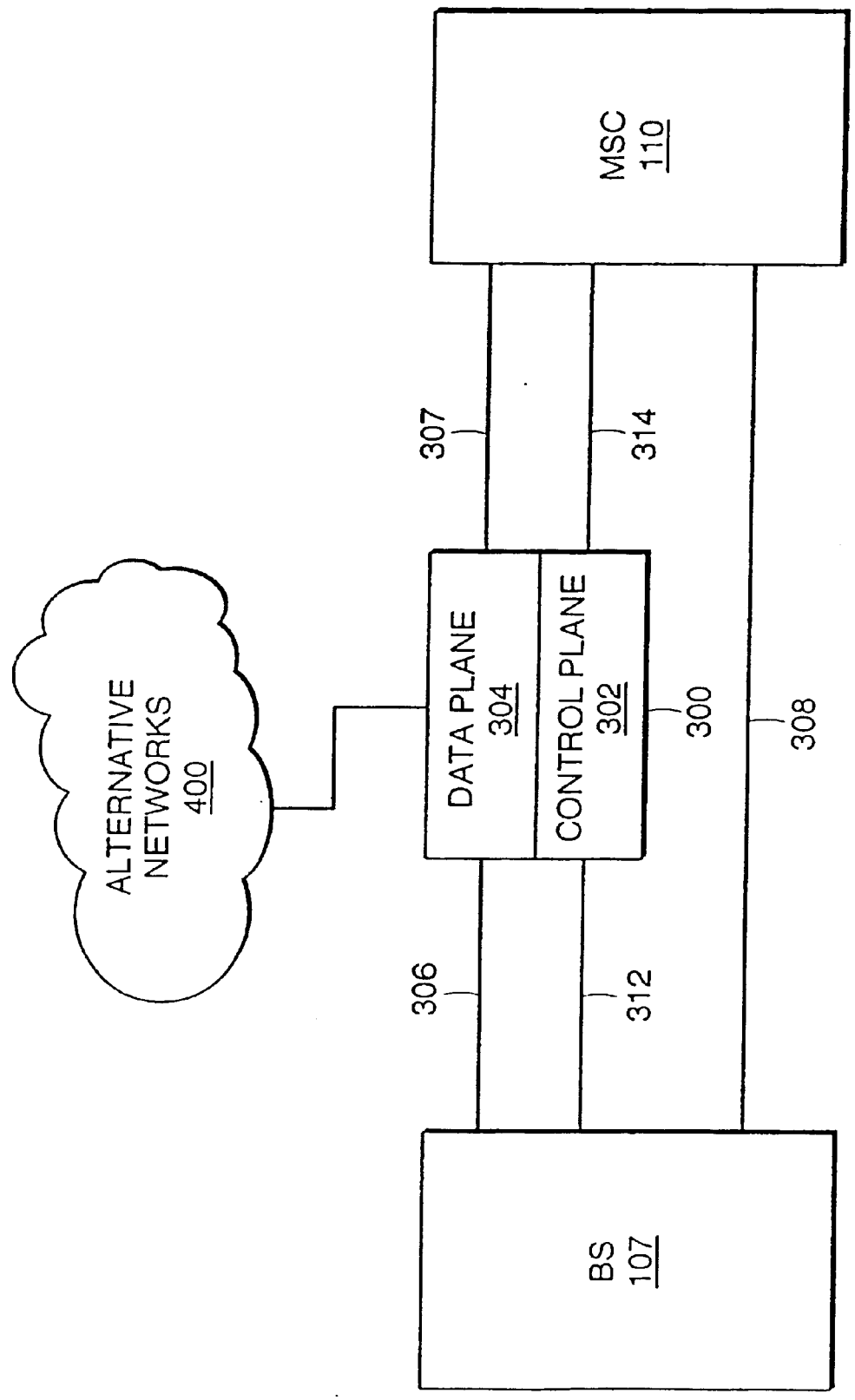
FIGS. 3A–B illustrates a proxy switch and certain deployments in a mobile network according to preferred embodiments of the invention.

FIG. 3A shows one preferred deployment of a proxy switch 300, in which the proxy switch 300 is positioned between the BS 107 and the MSC 110. Only a subset of trunks 306 carrying user traffic needs to be terminated on the proxy switch; other trunks 308 may directly connect the MSC 110 and BS 107. All control links 312 from BS 107 terminate at proxy switch 300. The proxy switch includes a control plane 302 and a data plane 304 (also known as a "bearer plane"). The control plane 302 handles all the signaling traffic, and the data plane 304 handles all the user traffic for the trunks connected to the proxy switch.

Under the preferred deployments, the proxy switch 300 communicates according to the same signaling protocol on both sides of the control plane 302. For example, in embodiments suitable to CDMA technology, the signaling links 312 between the BS 107 and the proxy switch 300 convey information according to the IS-634/IOS A1 interface. Similarly, the signaling links 314 between the MSC 110 and the proxy switch 300 convey information according to the A1 interface. This situation contrasts with other mobile switching complexes such as the MSC or the BS in which different signaling standards are used for communication on the different sides of the switch. The MSC for example has A1 interface on one side of the complex and communicates according to SS7/ISUP on the other (i.e., the PSTN side of the switch).

Under other embodiments, the proxy switch terminates newer ingress interfaces A8, A9, and egress interfaces A10, A11 for CDMA2000 for carrying packet-based traffic, both signaling and user traffic. Current MSCs do not support these ingress interfaces.

The proxy switch's data plane 304 uses the same standards on each side of the switch. BS-side trunks 306, in CDMA embodiments, communicate according to the A2 and A5 interfaces, depending on whether voice or data, respectively, is being carried on the trunks. Likewise, MSC-side trunks 307 use the same interfaces. In contrast, the MSC has A2/A5 on one side but communicates according to PSTN 64 kb/s pulse coded modulation standards on the other side.

In addition, whereas all of the other entities in a mobile network use their own point codes within their signaling ("point codes" are used as unique identifiers in the network), in certain embodiments, the proxy switch 300 does not use its point code and instead uses the point codes contained in the messages it receives. By using the point codes of the BS or MSC, instead of the point code for the proxy switch, transparency of the proxy switch is facilitated.

Under certain embodiments, there is a one to one correspondence between an MSC and a proxy switch. Several BSs may work with a single proxy switch.

Figure 3B:
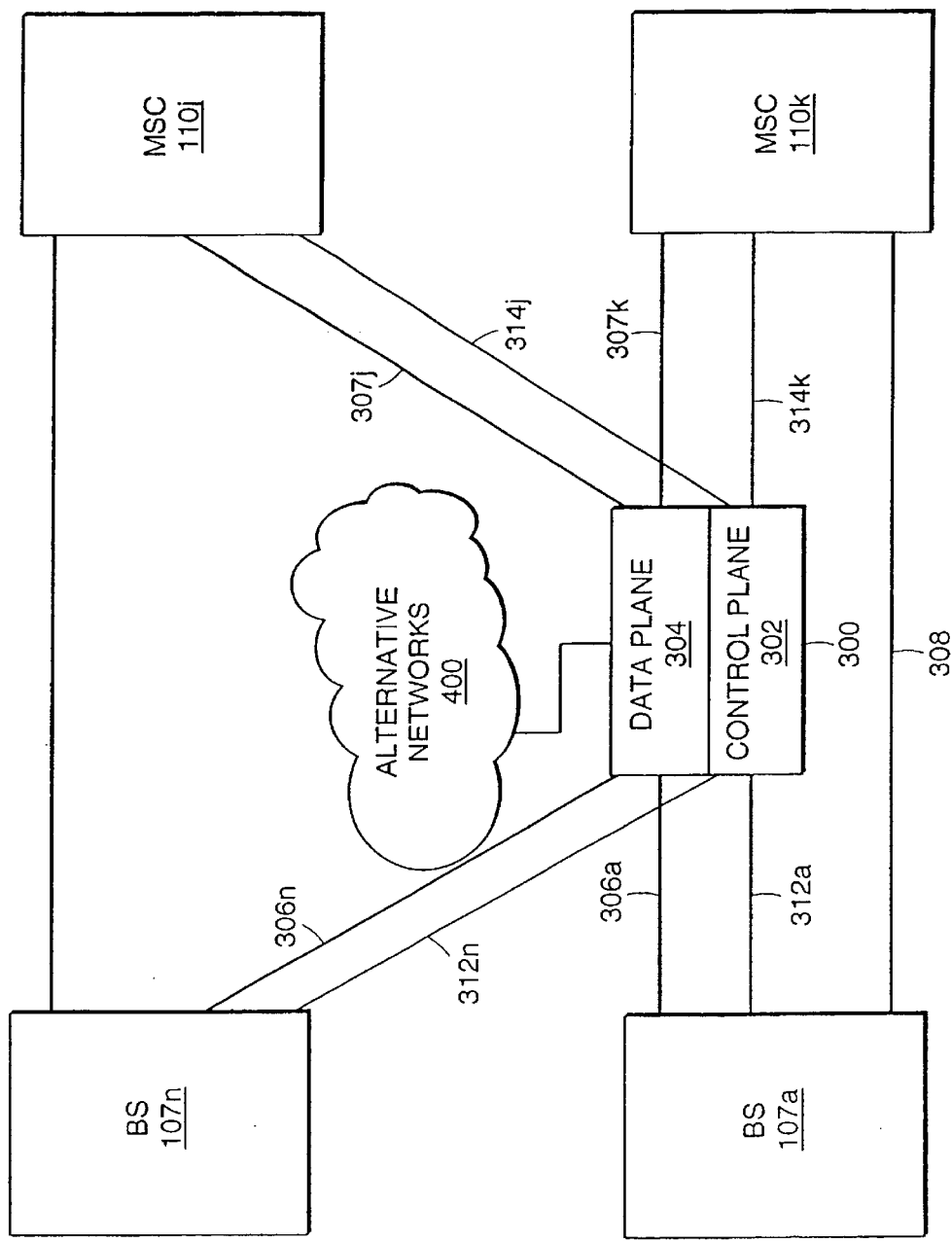

FIG. 3B shows another preferred deployment. In the deployment of FIG. 3B, the proxy switch 300 may be in communication with more than one MSC $110_j$–$110_k$. The control plane 302 of the proxy switch 300, like the deployment of FIG. 3a, may receive control signals 312a–n from several BSs 107a–n. In addition, the data plane 304 may receive trunks 306a–n from several BSs. Unlike the deployment of FIG. 3a, however, the deployment of FIG. 3b also receives and sends information on signaling links 314j–k to multiple MSCs $110j$–$k$.

The deployment of FIG. 3b may be configured to distribute the load on the system better, to improve reliability (by providing an alternative path to an MS), and to provide services that consistently match a user's profile. Under one embodiment that uses the deployment of FIG. 3B, the system may be configured so that calls from a given caller are routed to an MSC that handles most of the user's traffic (as opposed to merely being the geographical location where the user turns on his or her MS 114). This determination may be based on statistical monitoring or may be configured into a user's profile. By so configuring the system, the amount of location update messages and the like may be reduced. Under other embodiments, the proxy switch may be configured so that calls are directed to MSCs that are relatively underutilized. In this fashion, system administrators may better tailor the load on the entire communication system under management. In addition, calls may be routed to MSCs that provide services consistent with a given user's profile.

The proxy switch 300 includes software that accepts all signaling messages and, depending on the message and the state of the system, performs at least one of the following:

1. passes the message unaltered to the MSC or BS addressed in the message;
2. intercepts messages between the MSC and BS;
3. for some intercepted messages, converts the intercepted messages to a different message and sends the converted message in place of the original, intercepted message to the MSC or BS addressed in the intercepted message;
4. siphons the message from the mobile- and PSTN-based network to an alternative network.

The types of actions performed in each case along with the triggering events are described below.

In many instances, particularly when a message from an MS 114 is siphoned and the traffic is directed to an alternative network, the proxy switch 300 may act as an MSC 110. In such a role, the proxy switch fulfills the responsibilities and roles that a traditional MSC would perform. Some of these functions and roles pertain to mobility management. Consider the case of a roaming MS; as it roams from one cell to another, it may roam to a cell served by a different MSC, thus necessitating a handoff between the source and target MSCs. If the proxy switch 300 has siphoned the message and the call/session has been directed to an alternative network, then the handoff has to be managed by the proxy switch analogously to the way a handoff would be managed by a conventional MSC. The proxy switch has to ensure that the appropriate databases are updated with the new location of the MS. Another function of the proxy switch pertains to the assignment of resources. In particular, when an MS initiates a message requesting a new call/session, appropriate circuits (channels) need to be assigned for this session. Depending on the configuration of the system and the system state, the proxy switch makes such assignments analogously to the way conventional MSC assigns circuits.

Figure 4:
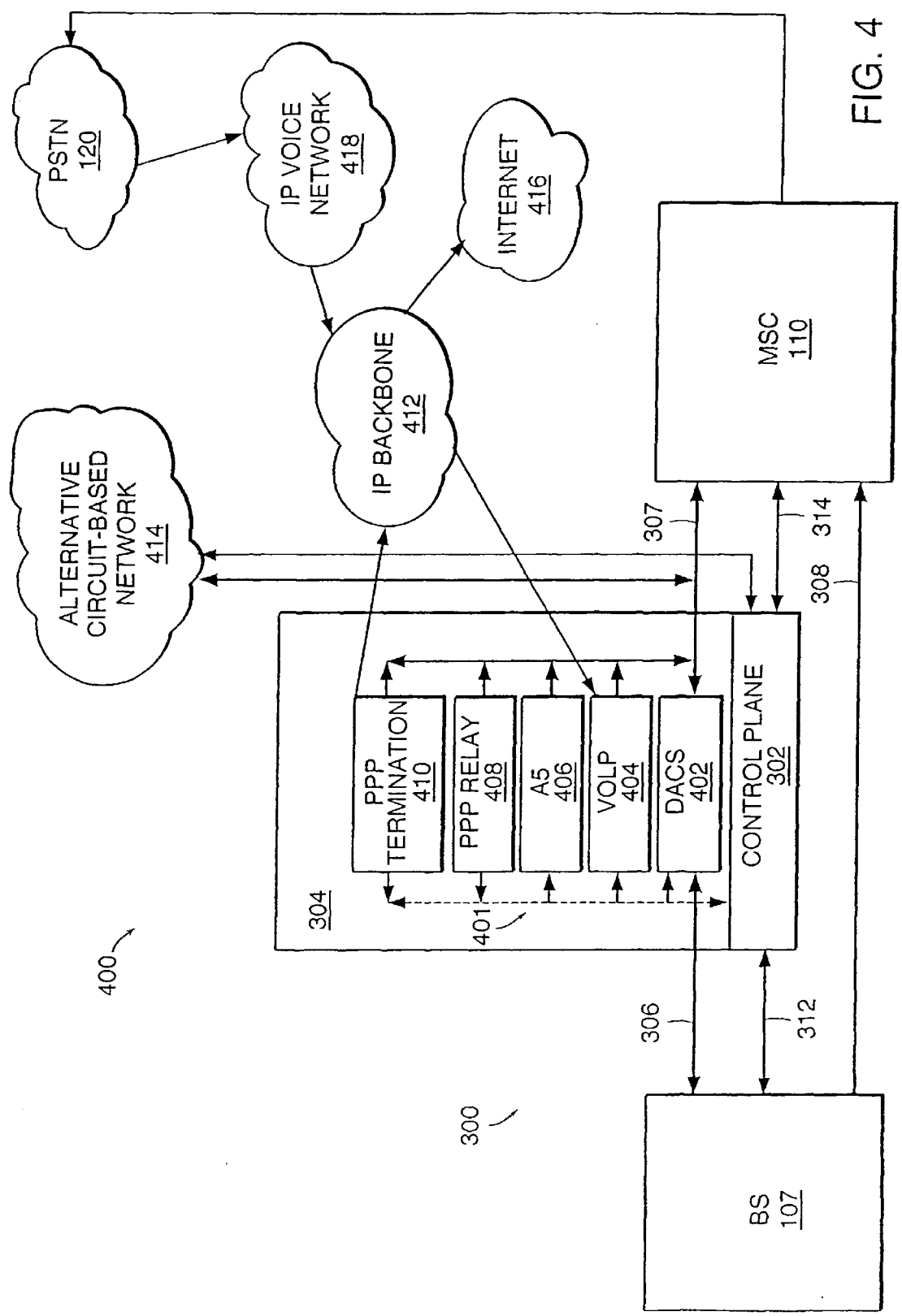
FIG. 4 illustrate an exemplary data plane of a proxy switch according to a preferred embodiment of the invention.

FIG. 4 shows an exemplary deployment in which the proxy switch 300 is connected to several alternative networks, such as an IP backbone 412 or an alternative circuit-based network 414, e.g., a different carrier. These alternative networks may be used to carry voice and/or data traffic to desired destinations while avoiding in whole or in part the PSTN 120 along with the costly resources of MSC 110. Alternatively, these arrangements may be used so that circuit traffic could be backhauled to a different network; for example, circuit traffic from Nashua, N.H. could be backhauled to an MSC in Waltham Mass. Or, they may be used to connect to other networks. For example, the IP backbone 412 may communicate with IP voice networks 418 or the Internet 416. As will be explained below, when siphoning traffic to an alternative network both control information (e.g., from the signaling messages) and voice or data from the bearer circuits on links 306 may be sent via an alternative network.

To support these exemplary deployments and to maintain transparency, preferred embodiments of the invention provide certain core functionality. The core functions facilitate siphoning of traffic from the trunks 306 before they reach the MSC 110; facilitate the injection of traffic onto trunks 306 from alternative networks; facilitate transparent operation; serve as building blocks for higher level applications; and/or support error recovery procedures.

Procedure for Mobility Management in the Presence of a Proxy Switch

Figure 5:
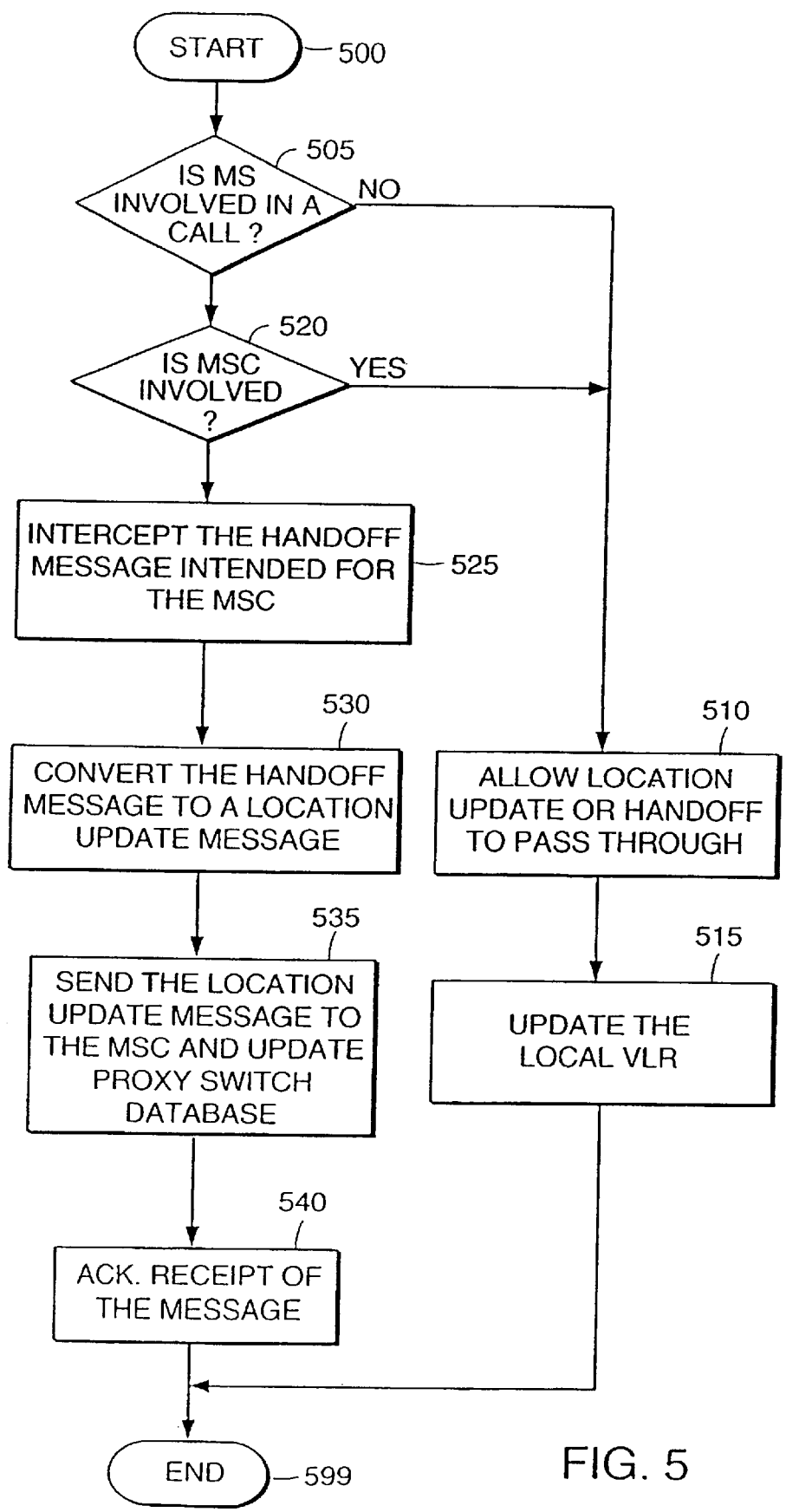
FIG. 5 illustrates mobility management logic of a proxy switch according to a preferred embodiment of the invention.

When a MS 114 roams in a network, standard procedures for mobility management require the MS to issue location updates or registration notifications as the MS roams from one cell to another. These updates are received by the MSC 110 (via the BSC), and eventually, the VLR/HLR complex is updated with the new location of the MS. However, the standard procedures may not work in certain embodiments and system states of the invention. For example, the MS may be involved in a call that does not use the MSC (e.g., one being handled by an alternative network) yet the MS may need to issue location update or handoff messages. To this end, preferred embodiments of the invention provide mobility management logic for the proxy switch, described with reference to FIGS. 3 and 5 conjointly.

If a location update or handoff message is received from the BS 107 by the proxy switch 300, the proxy switch 300 determines whether the MS is currently involved in a call 505. If the MS is not involved in a call, then the proxy switch 300 allows the location update message to pass through 510 to the MSC 110. The MSC 110 then updates 515 the VLR 116 as it does conventionally. The logic flow then ends 599.

If the proxy switch 300 determines that the MS 114 is involved in a call, the proxy switch checks 520 to see if the MSC 110 is involved in the call. For example, this may be done by analyzing state information for the call (also known as a "session") maintained by the proxy switch. If the MSC is involved in a call with the MS, then the proxy switch proceeds as described above, except that this time a handoff message is passed through to the MSC 110.

If the MS is involved in a call and the MSC is not involved with that call, the proxy switch 300 intercepts the handoff message 525 from the BS 107 and, using the information in the handoff message, converts the handoff message into a location update message 530. The location update message is then sent 535 to the MSC 110 and the proxy switch updates its own local database (not shown) reflecting the change. This local database serves as a VLR for the proxy switch and holds all of the information that a VLR does (since the proxy switch at times needs to function akin to an MSC). The proxy switch 300 then sends an acknowledgment message 540 to the BS 107. The logic flow then ends 599.

Procedure for Managing Supplementary Features in the Presence of a Proxy Switch

Under preferred embodiments of the invention, an MS may be busy at times when the MSC believes the MS is idle; for example, the MS may be busy with a data or voice call that is being handled by an alternative network when the MSC is attempting to deliver a call to the MS from the PSTN 120. To support such a situation, the proxy switch 300 provides logic for informing the MS of such a situation. Using this logic, supplementary services, such as traditional call waiting, may be provided by the proxy switch. Moreover, new forms of call waiting and other new services may be built on this core support function.

Figure 6A:
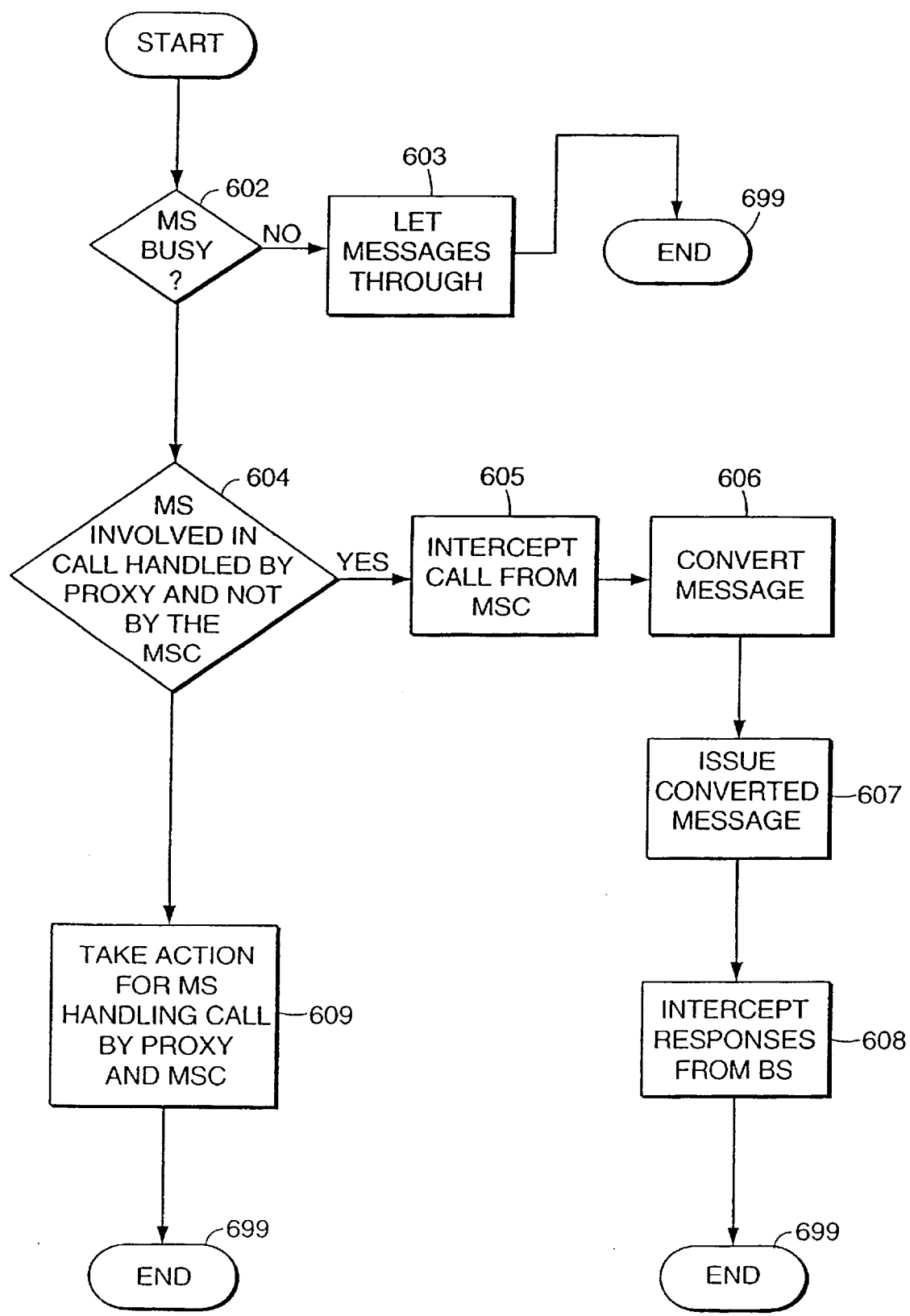
FIGS. 6A–B illustrate supplementary feature logic of a proxy switch according to a preferred embodiment of the invention.

Referring to FIGS. 3 and 6A conjointly, when a call comes into the proxy switch 300 from the MSC 110, the proxy switch determines whether or not the MS is involved in a call at the time the message comes in 602. If the MS is not busy, then the proxy switch 300 allows the MSC-originated message to pass through to the BS 603. The logic flow then ends 699.

If the MS is busy, the proxy switch then determines 604 if the MS call is being handled by the proxy switch but not by the MSC; for example, the call may be handled by an alternative network connected to the proxy switch (see FIG. 4) in which case the proxy switch needs to handle the call acting akin to an MSC; the proxy does not simply let messages pass through. If the call is being handled by the proxy switch but not by the MSC, the proxy switch intercepts 605 the call from the MSC 110, and converts 606 the intercepted message into a feature notification message. The proxy switch 300 then issues 607 the feature notification message to BS 107 for subsequent transmission to the MS 114, which will be used to notify the user of the incoming call. The proxy switch intercepts 608 any responses from the BS to the feature notification message and acts accordingly. How the proxy switch acts depends on the application using this logic.

If the MS is involved in a call handled by the proxy, and also involved with a call handled by the MSC, then the proxy switch takes an action 609 identified as a response for such a state. This action will depend on the particular application involved. Traditional call waiting is but one such service that may be built upon the above core function.

If at some moment in time, the MS is involved in two calls both involving the alternative network, and a third call arrives for the MS either from the alternative network or the MSC, the proxy switch will direct this third call as per the logic of the application. For example, in call waiting applications, the third call would be routed as per instructions contained in the subscriber profile; a common option is to direct the call to the voice mail of the subscriber. A similar logic is used if the MS is involved in two calls both involving the MSC, and a third call arrives for the MS from the alternative work; again, the subscriber profile dictates how this third call is to be handled and this logic is followed by the proxy switch. Finally, it should be noticed that if the MS is involved in two calls both involving the MSC and a third call arrives for the MS, the MSC itself, in this case, will determine the logic it follows to handle this third call.

Figure 6B:
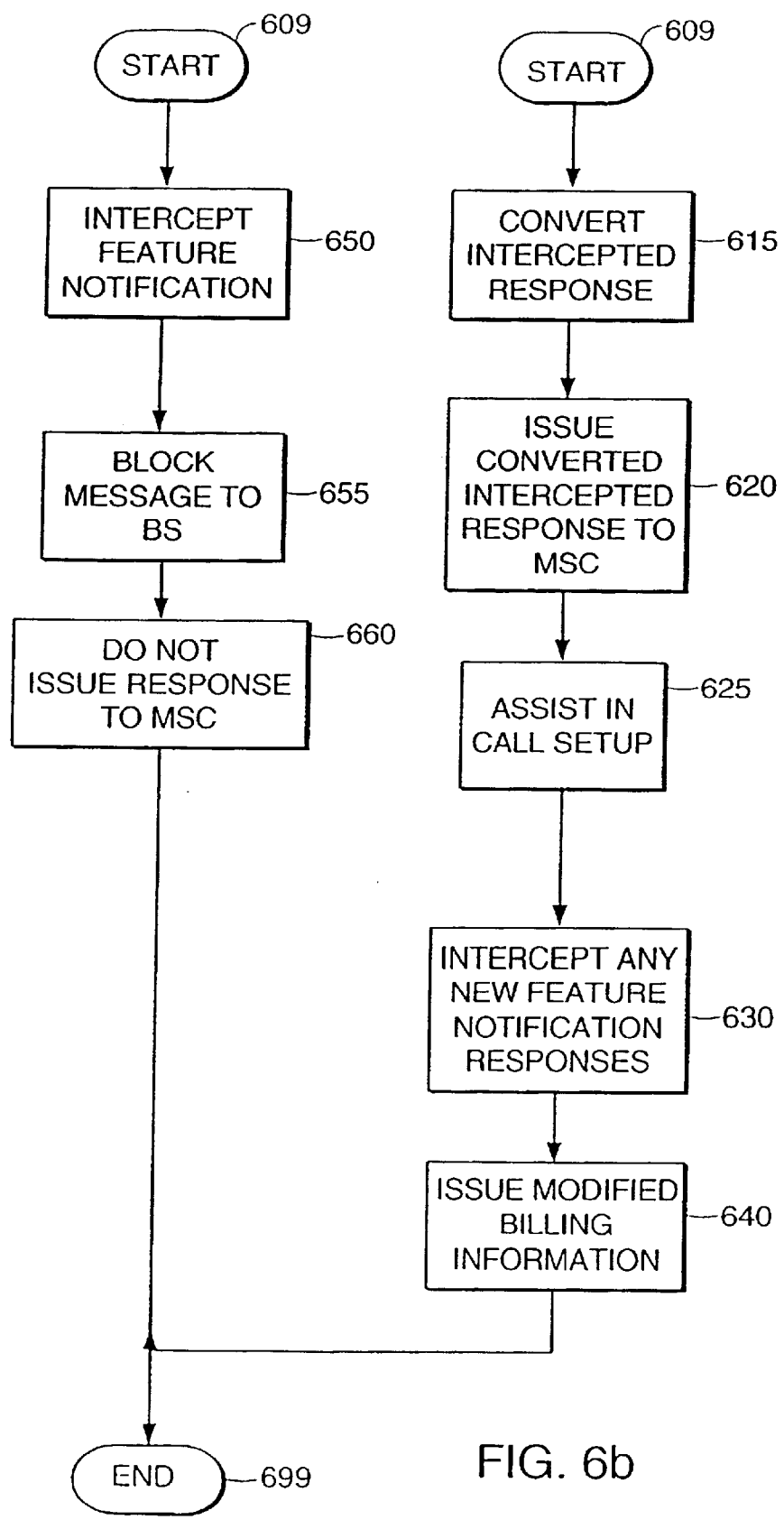

For example, FIGS. 3 and 6B conjointly illustrate an exemplary call waiting application. The logic acts as described above through the acts labeled 608 or 609 (notice that FIG. 6B starts with blocks 608 or 609, as opposed to 600); that is, though FIG. 6B helps describe a particular supplementary feature like traditional call waiting, the initial acts for this supplementary feature are those described with reference to FIG. 6A.

If the logic starts at 608, it means that the proxy switch has already detected that the MS is involved with a call, the proxy switch is handling the call, but the MSC is not. At this point, the proxy switch has already intercepted call requests from the MSC, converted them into a feature notification and issues the feature notification to the BS. The proxy then receives and intercepts responses to such message from the BS.

Under the call waiting application logic of FIG. 6B, if the user indicated that they are willing to accept the call, the proxy switch converts 615 the response to a message indicating that the MS is accepting the new call from the MSC. The proxy switch 300 then issues 620 the converted message to the MSC. At this point in this example, the MSC "thinks" the call is an ordinary call, that is, the MSC state reflects only one call session to the MS. In fact, with the acceptance of the new call, the user is receiving two calls in call waiting mode: one call being handled by the MSC and another by the proxy switch. The proxy switch state reflects the two calls. The proxy switch 300 assists 625 the MSC 110 with setting up a new call. (This last step is only reached if the user accepted the call; if the user did not accept it, the proxy logic times out and never gets to act 625.) For example, the proxy switch 300 may need to park calls from an alternative network so that the accepted call from the MSC can go through to the MS. The proxy switch 300 then intercepts 630 any subsequent feature notification responses from the MS and re-directs to MSC or proxy switch as needed. For example, the user may want to "toggle" between calls being served by the mobile and the alternative networks. The proxy switch may need to interpret this response to park one call and connect another to the user as part of the act of intercepting subsequent feature notifications. In other circumstances, the proxy switch may need to send this type of response to the MSC if the MSC has multiple calls (some parked) intending to connect to the MS. When the call ends, the proxy switch 300 sends 640 appropriate billing information to the system. This is needed so that the user is billed appropriately when services are rendered not involving the MSC. The manner in which the information is kept and send to a billing system depends on the implementation and service provider using the system. Most service providers specify the manner in which billing information is to be collected, formatted and delivered.

If the MS 114 is involved with a call and is also involved with a call handled by the MSC, and if the MSC indicates a new call is intended for the MS, then the proxy switch 300 may be configured to intercept 650 the feature notification message from the MSC that is destined for the BS 107. The feature notification message is blocked 655 from being passed to the BS, and consequently no response is issued 660 to the MSC from the BS, because the feature notification message was blocked from being sent to the BS. The logic flow then ends 699. The MSC does not get a response and assumes the MS does not want to receive the call. The MSC then uses standard procedures to terminate this call, e.g., voice mail of subscriber or plays a message stating the subscriber is unavailable.

The call waiting application logic of FIG. 6B is limited to handling two concurrent calls. The same general approach may be extended to handling more than two calls for call waiting, to handling multiple calls from an alternative network, to handling data calls and voice calls, and the like.

Procedure for Fault Management in the Presence of a Proxy Switch

Standard procedures exist for fault management of the signaling links between the BS 107 and the MSC 110. Under these procedures, both the BS and the MSC are considered as peers, say Peer1 and Peer2. Both peers maintain two sets of numbers, called the Forward Sequence Number (FSN) and the Backward Sequence Number (BSN). The FSN identifies the last message sent to a peer and the BSN identifies the last message received from a peer. For example, assume there exist two signaling links SLC0 and SLC1 between Peer1 and Peer2. If Peer1 has FSN=5 and Peer2 has BSN=3 then Peer1 knows that it has sent all messages up to and including message 5 to Peer2; Peer 2 knows that it has received all messages up to and including message 3. If SLC0 breaks and Peer1 detects such a break, Peer1 sends a Change Over Order (COO) message to Peer2 requesting Peer 2 to change over to link SLC1. Peer2 responds with COA (Change Over Acknowledged). Included in these messages are the BSN numbers based upon which missing messages can be re-transmitted. For example, in the above instance, messages 4 and 5 need to be retransmitted to Peer 2.

As a further example, consider an instance wherein Peer1 has FSN=10 and BSN=6; Peer2 has FSN=8 and BSN=5. Also assume that there are two signaling links existing between Peer1 and Peer2, denoted as SLC0 and SLC1, and that SLC0 breaks as detected by Peer1. Then, Peer1 sends a COO message using link SLC1 to Peer2 and includes its BSN (=6) in the COO message. When Peer2 receives this message, it compares the received BSN with its internal FSN (=8) and hence determines that the last 2 messages (8−6=2) need to be retransmitted. Peer2 queues up the last two messages to be re-transmitted and sends out a COA message containing its BSN (=5). Peer1 receives the COA message and compares the received BSN with its internal FSN (=10) and determines that the last 5 messages (10−5=5) need to be re-transmitted. These last 5 messages are queued up by Peer1 to be retransmitted to Peer2.

Under preferred embodiments, the standard replay and recovery mechanism between the BS and MS are not expected to work. In short, the BS 107 may send messages to the proxy switch that are never received by the MSC, e.g., siphoned messages, and vice-versa, e.g., MSC messages that are blocked. Consequently, the basic FSN/BSN state at the BS and the MSC will not accurately reflect the state of the whole system.

Figure 7A:
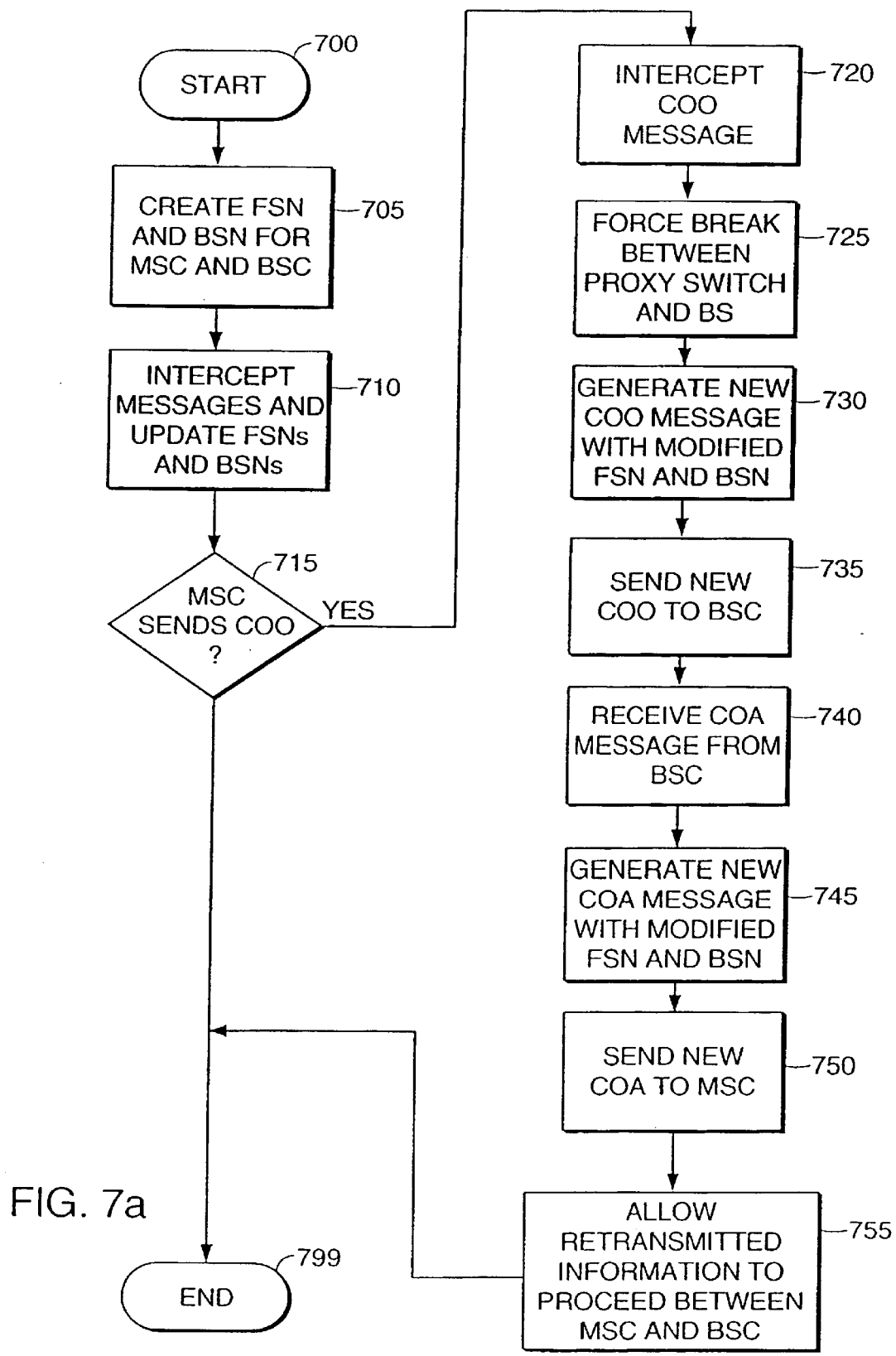
FIG. 7A illustrates fault management logic of a proxy switch according to a preferred embodiment of the invention.
Figure 7B:
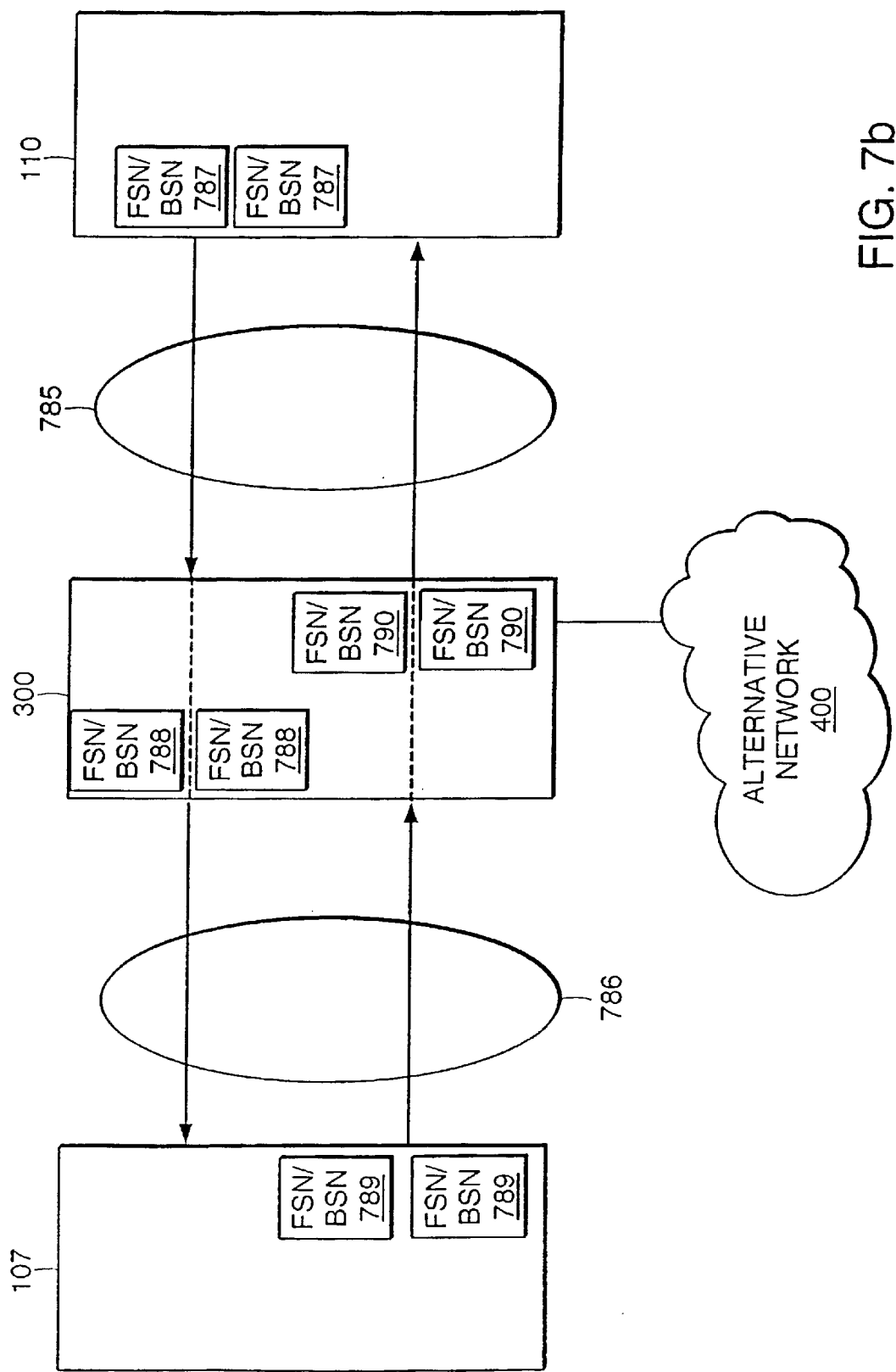
FIG. 7B illustrate FSN and BSN counters of a proxy switch according to a preferred embodiment of the invention.

Accordingly, under preferred embodiments of the invention, the proxy switch provides a new form of fault management. Referring to FIGS. 3 and 7A–B conjointly, the proxy switch creates 705 one set of FSN and BSN counters for each link to the MSC 110 and one set of FSN and BSN counters for each link to the BS 107. With particular reference to FIG. 7B, which shows a single link arrangement to illustrate the concept, the FSN /BSN pair 787 on the MSC for the link 785 and the FSN/BSN pair 789 for the link 786 are conventional. Pair 787 tracks the number of messages sent and acknowledged (or "acked") on link segment 785 out of the MSC; pair 789 tracks the same but out of the BS. The proxy switch 300 includes FSN /BSN pairs 788 and 790. Pair 788 tracks the number of messages sent and acked on link segment 786 out of the proxy switch 300 toward the BS 107; pair 790 tracks the number of messages sent and acked on link segment 785 out of the proxy switch 300 toward the MSC 110.

As alluded to above, there is no expectation that the values for pair 787 will equal the values for 788. For example, an MSC message may be blocked from being transmitted to the BS 107 as a part of normal proxy switch logic, as discussed herein. By so blocking the message, the FSN value of 787 should be one higher than that of 788. In addition, there is no expectation that the discrepancy between FSN and BSN of 787 and of the FSN and BSN 788 should be equal. For example, assume the simple case of one message from MSC 110 that is supposed to be blocked at proxy switch 300 as a part of normal proxy switch logic, as discussed herein. The discrepancy at 787 will be one until there is an acknowledgement received at MSC 110, but there will be no discrepancy at pair 788, because no messages are sent to BS 107.

As messages are received at the proxy switch 300, the proxy switch intercepts them and updates the FSN/BSN pairs as outlined above.

If the proxy switch 300 detects 715 a COO message from the MSC 110, indicating that link 785 went down, then the proxy switch 300 intercepts that message 720 and does not allow it to pass to the BS 107. The COO includes the BSN information of pair 787 and identifies a new link (not shown) that the signaling should changeover to. The proxy switch then forces a break 725 on a link 786 between the proxy switch and the BS (link 786 corresponds to the link 785). The break is simulated as follows. Every few milliseconds conventional BSs and the MSCs send out messages called "fill in signals," which are received and the receiver then knows the links are operational. If the receiver does not get a fill in signal in the specified length of time, it assumes a break and sends a COO message. So to simulate a break, one embodiment of the invention modifies the software-based protocol state machine to not send the "fill in signal," and hence signal a break and cause a COO to be generated at the proxy switch (the modification being relative to conventional MSC).

The proxy switch generates a COO message to the BS 107 with BSN of pair 788, as opposed to the BSN information in the original COO message which contained information for pair 787. This new COO informs the BS of the number of messages it received on (the emulated-broken) link (i.e., BSN of 788). The generated COO uses a new link (not shown in FIG. 7B) which is used to changeover to. This new link corresponds to the changeover link to between the proxy switch 300 and the MSC 110.

The modified BSN numbers are then sent 735 to the BS 107 with the new COO message. The COO is sent on an unbroken link. The proxy switch 300 then waits for and receives a COA (acknowledgement) message 740 from the BS 107, and generates 745 a new COA message. The new COA will contain the BSN information of pair 790, as opposed to the information in pair 789. The new COA is sent 750 to the MSC 110.

The proxy switch then awaits for and receives retransmitted information to be sent on the new link from the MSC and from the BS. Any information received is then retransmitted 755 to the respective destination or handled as it would be in the ordinary course of things (including potentially being blocked etc. as described herein). The logic flow ends 799.

Under the above embodiment, the proxy switch relies on the BS or the MSC to detect breaks in respective signaling links. The break in the signaling link is forced as a result of current BS architectures; i.e., the breaks are needed to create the necessary events for COOs. Under other embodiments, the proxy switch may detect breaks, and in response to such, the proxy switch would mimic a MSC in relation to a BS or mimic a BS in relation to a MSC.

Procedure for Automatic Triggering of Siphoning Based on COO messages

Under certain embodiments of the invention, the proxy switch may dynamically determine when the system may benefit from redirecting (or siphoning) messages to an alternative network (see, e.g., 400, FIG. 4). For example, under one embodiment of the invention, the proxy switch 300 monitors the signaling bandwidth directly or indirectly as a measure of system bandwidth (e.g., reduced signaling bandwidth translating to reduced system bandwidth). In one embodiment, a Change Over Order (COO) from the MSC may be used as a signal of congestion at the MSC, or at least that the bandwidth to/from the MSC will be impaired until the effected link is revived and traffic is changed back to that link. Thus, the proxy switch 300 interprets a COO as a triggering event from to "slow down" traffic to the MSC, and in response, initiates traffic siphoning to an alternative network connected to the proxy switch.

Figure 8:
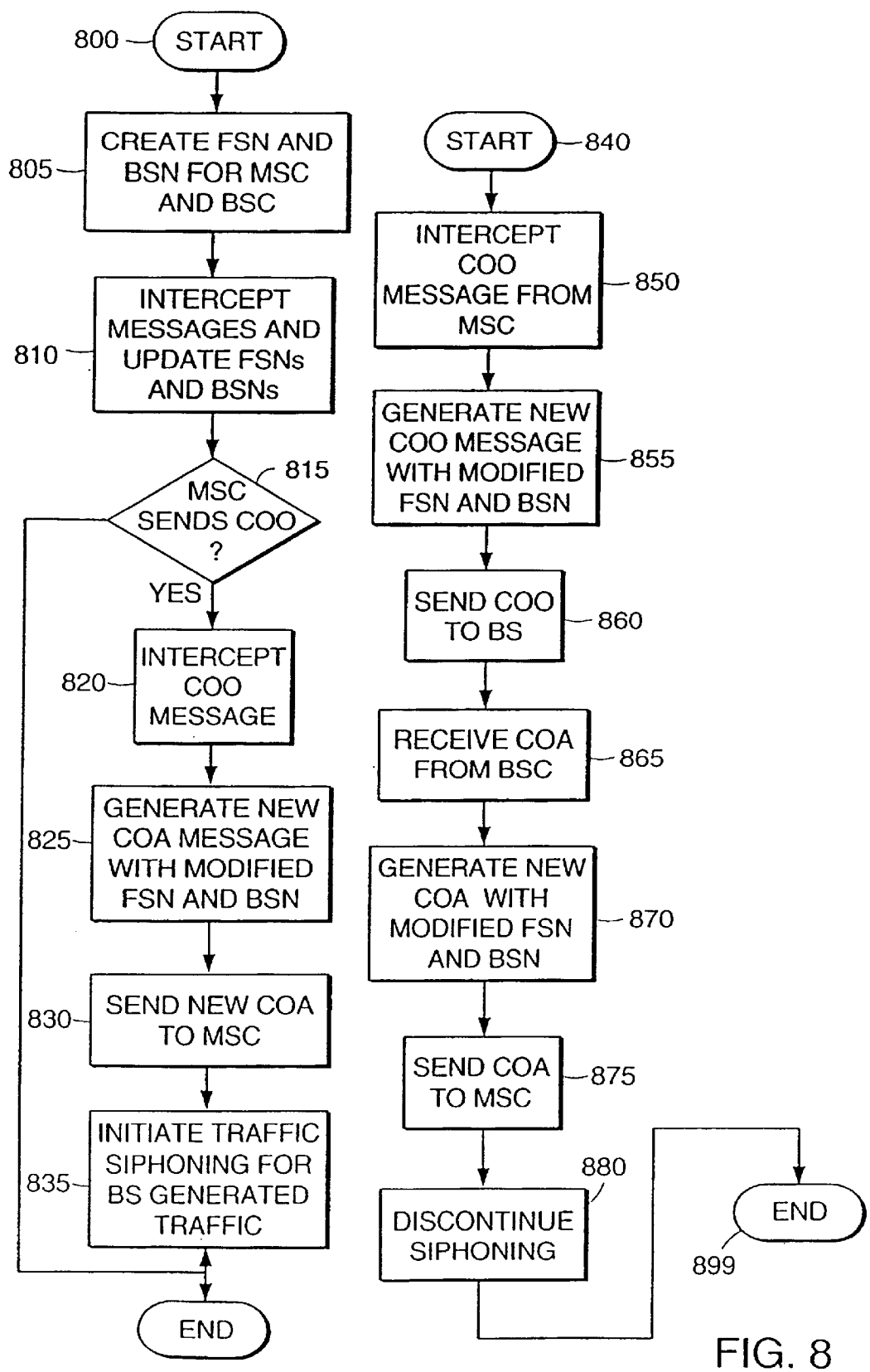
FIG. 8 illustrates message siphoning logic of a proxy switch according to a preferred embodiment of the invention.

One form of exemplary logic in this regard is shown with reference to FIG. 8. The proxy switch creates 805 one set of FSN and BSN counters for each link to the MSC 110 and to the BS 107. Each message to or from the BS is intercepted and the sequence numbers are updated 810 accordingly. If the proxy switch 300 detects 815 a COO message from the MSC 110, then the proxy switch 300 intercepts that message 820 and does not allow it to pass to the BS 107. In this instance, the COO only reflects the requested changeover and does not indicate that messages need to be replayed. The proxy switch 300 then generates a COA message 825 with modified BSN numbers for MSC and sends COA message 830 to the MSC 110. The modified sequence numbers are the ones created by-the proxy switch during the processing of messages, similar to that described above. Thus, the MSC now believes that its COO has happened. Communication bandwidth between the MSC and the BS will be lower as a consequence of the changeover, since one less signaling link is available.

However, though the bandwidth between the proxy switch 300 and the MSC may be impaired as a result of COO described above, the bandwidth between the BS 107 and the proxy switch 300 is not impaired. The proxy switch may take advantage of this context by siphoning traffic to an alternative network. Accordingly, the proxy switch initiates traffic siphoning 835 for traffic generated from the BS-side of the proxy switch. There are many types of alternative networks that may be used to carry voice as well as data traffic from a MS 114 (see, e.g., FIG. 4). If there are multiple types of alternative networks connected to the proxy switch, then the proxy switch may select the type of alternative network based on the type of communication, e.g., data or voice. In initiating the siphoning, the proxy switch will configure the data plane as needed to route certain bearer circuit traffic to appropriate alternative networks (as will be explained below). For example, the VoIP assembly 404 may be configured with information extracted from the signaling messages.

The siphoning of traffic continues for the given session. The proxy switch 300 thereafter maintains the FSN, BSN numbers as described above. Any COO messages from BS 107 are then intercepted and a COA is generated and sent to the BS, while maintaining the FSN and BSN counters.

Any COO messages from the MSC 110 are intercepted 850 and checked to see if they indicate that the MSC is again ready to receive traffic on the previously down link, i.e., to see if the COO is a changeback message. If there is such a message, the proxy switch interprets this to mean that the MSC can again handle a higher level of traffic and will take actions to "reconnect" the siphoned links and traffic. (If the COO is not a changeback message, it may be yet another changeover message indicating a context that may benefit from further siphoning of traffic.)

If there is a changeback message, a new COO is generated 855 with modified BSNs and sent 860 to the BS 107. The modified BSN are the ones maintained by the proxy as discussed above. The proxy switch 300 then waits for and receives a COA message 865 from the BS 107. A new COA message is then generated 870 with modified BSN numbers and sent 875 to the MSC 110. The proxy switch then discontinues the traffic siphoning procedure. The control plane instructs the data plane accordingly.

Under certain embodiments, the decision to siphon traffic may include the other considerations. For example, the alternative network may provide QoS guarantees that may be considered by the proxy switch logic. In one embodiment, siphoning is only at session boundaries. Accordingly, if a call is to be siphoned, it is siphoned at call origination.

The description above was premised on the COO being sent as indicative of network congestion. Under one embodiment of the invention, the logic described above for automatic siphoning is supplemented with the fault management logic described in relation to FIGS. 7a–b. In this embodiment, every time that the proxy switch 300 gets a COO from the MSC it performs the replay logic discussed above. COO messages from the BS, however, are always treated as a break in the signaling link, and replay logic is performed but no siphoning.

Procedure for Preserving Point Codes Across BSC and MSC

In SS7 networks, all network components are addressed by unique numbers called "point codes." Consequently, all the BSCs and MSCs will have unique point codes. A message from a BSC to an MSC will, in general, contain a destination point code, e.g., the point code of the intended MSC, and an originating point code, e.g., the point code of the BSC that sourced the message.

Messages from the BSC to the MSC, for calls originating from the MS, additionally request a bearer circuit to be assigned for the call. Bearer circuits (which carry voice or data) are identified by Circuit Identification Codes (CIC).

To support transparent operation by the proxy switch, the point codes and CICs traveling between the BSC and MSC are preserved for all messages. This requirement is complicated by the fact that while some of the circuits carrying bearer traffic will transparently traverse from the BSC to the MSC, other circuits emanating from the BSC will be terminated at the proxy switch, and the MSC will be unaware of such terminations.

As stated above, some trunks 308 are pre-provisioned for direct connection between the BS and MSC, whereas other trunks 312 connect to the proxy switch. Analogously, under preferred embodiments, some bearer circuits are pre-provisioned for direct connection between the BS and the MSC ("pass through circuits"), and the remaining circuits are terminated at the proxy switch ("siphonable circuits").

Under one embodiment, under normal operation, the MSC may not assign the siphonable circuits for any calls. When siphoning traffic (as described above), the proxy switch may assign a siphonable circuit for a call from the BS (by communicating the appropriate CIC to the BS), and the BS will respond by sending the voice or data on that circuit. As will be explained below, the voice or data may then be read from this circuit and passed on to an alternative network, accordingly via DACS 402.

To ensure the consistency of information at the MSC in the event of a proxy switch failure, under one embodiment of the invention, a network management system accesses the CIC database at the MSC and marks the siphonable circuits as available. As a result of such action, the MSC will think that these circuits are available to be allocated, and the network will behave like a conventional mobile network (i.e., one lacking a proxy switch).

When the proxy switch recovers, the network management system again accesses the CIC database at the MSC, but this time marks the siphonable circuits as "unavailable". It also accesses the proxy switch database and marks the siphonable circuits as "available". These circuits will then be assignable by the proxy switch as described above. Under some embodiments, the siphonable circuits may be marked "unavailable" at the MSC and "available" at the proxy switch in a gradual manner so that the proxy switch gradually gains control over more of the siphonable circuits.

To handle the deployment of FIG. 3B, the techniques described above need to be supplemented. In particular, to handle the deployment of FIG. 3B, the proxy switch needs to intercept messages from the BS and change point codes to reflect a re-mapped MSC. Under one embodiment, this is done at a session-level of granularity, meaning that the re-mapping to a new MSC may be determined at session boundaries. Alternatively, the re-mapping may be done at other levels of granularity, for example, when a MS is turned on. Some embodiments perform the mapping by correlating equipment serial numbers (e.g., included in messages when a MS is turned on) to MSCs and their corresponding point codes.

Hardware Architecture

Referring conjointly to FIGS. 3 and 4, preferred embodiments of the proxy switch 300 include a control plane 302 and a data plane 304. The control plane includes a combination of processing hardware and associated software. The data plane largely comprises hardware that is responsive to commands from the control plane.

The control plane includes programmable signaling cards (e.g., PMC 8260 available from Force Systems) to receive the signaling information from the signaling links 312, 314 and to perform the initial processing thereof. This initial processing includes sending and terminating information on the signaling links and extracting, under programmatic control, the message information contained in the signaling messages. Once the message information is collected, the signaling cards cause the message information to be passed to a programmable processor card (e.g., RPC 3305 and 3306 available from Radisys) which is then responsible for carrying out the functionality of the proxy switch in response thereto as described above.

The control plane is constructed with passive fault tolerance mechanisms. These mechanisms ensure that on catastrophic failures of the control plane, the signaling links received by one side of the control plane will bypass to the other side. Thus, if the control plane fails the links are bypassed across the control plane and the BSC and MSC may communicate as they do conventionally.

The data plane 304 of an exemplary embodiment is shown in FIG. 4. It includes a DACS 402, a Voice over IP assembly 404, a Data termination module 406 (e.g., to terminate A5 data in CDMA networks), a PPP relay assembly 408, and a PPP termination assembly 410. The various assemblies may be packaged on one or more modules.

The DACS 402 receives the bearer circuits of trunks 306 and terminates the information received on the trunks; it also transmits voice and data on those trunks. Pre-provisioned ports for the DACS 402 are connected to VoIP 404 and the Data termination assembly 408. The Data termination assembly 408 is, in turn, is connected to the PPP Relay 408, which in turn is in communication with the PPP termination assembly 410. Moreover, the data plane may also be used to connect to alternative circuit-based networks, e.g., to backhaul traffic to a circuit-MSC in another regional network.

All of the data plane entities receive control commands from the control plane 302 via control channels 401 which is used to carry information according to H.248 or Media Gateway Control Protocol (MGCP). The control channel, among other things, is used to inform the DACS 402 how to provision the bearer circuits. For example, a given input circuit from the BS 107 is mapped to an output port to one of the assemblies. The control channel is also used to convey control information to the various assemblies. For example, the signaling information contains control information such as destination IP addresses that may be used to create destination addresses needed by the VoIP assembly. This information will then be used by the VoIP assembly to deliver the voice information received from the DACS by packetizing the information accordingly and sending it according to the appropriate protocols, e.g. RTP/UDP/IP.

The data plane is constructed with passive fault tolerance mechanisms. These mechanisms ensure that on failures of the data plane, the trunks received by one side of the DACS will bypass to output trunks connected to the MSC. Thus, if the data plane fails the trunks are bypassed across the data plane and the BSC and MSC may communicate as they do conventionally.

Software Architecture

Figure 9:
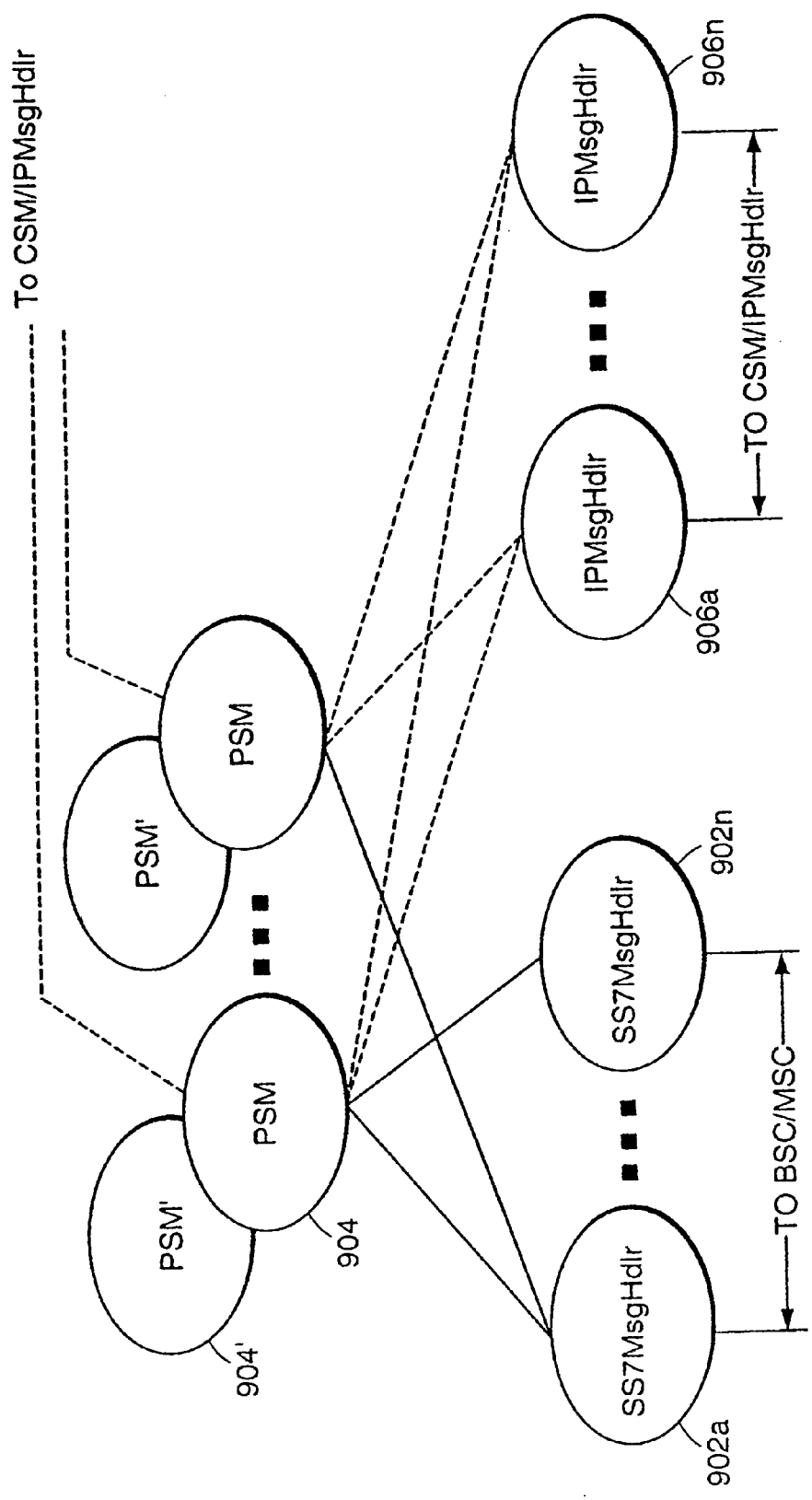
FIG. 9 illustrates software process architecture of a proxy switch according to a preferred embodiment of the invention.
Figure 10:
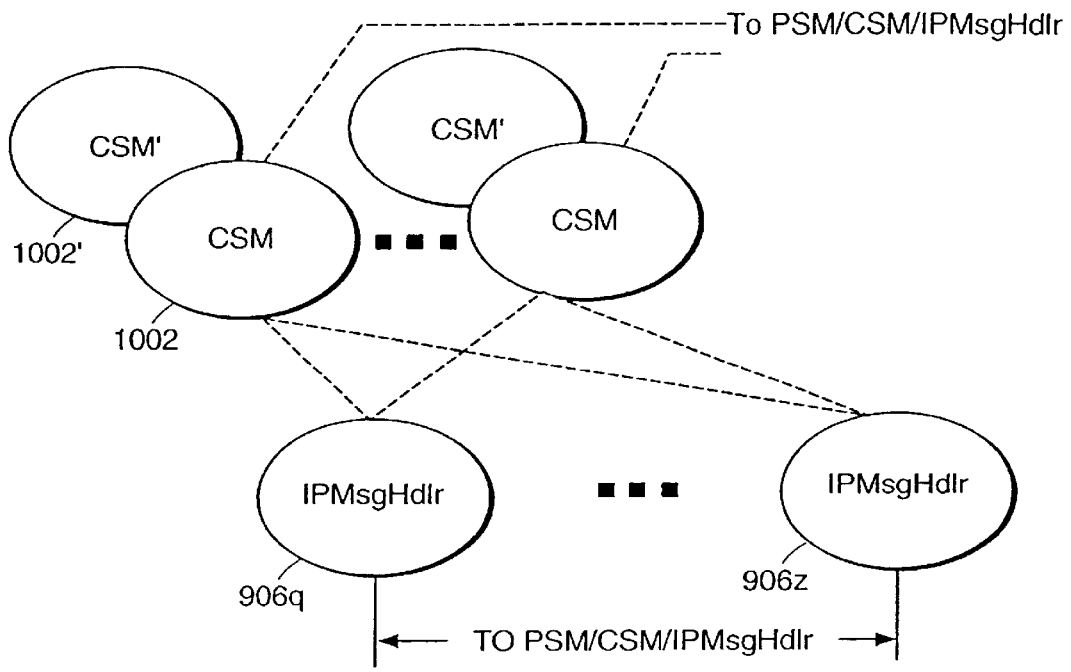
FIG. 10 illustrates software process architecture of a proxy switch according to a preferred embodiment of the invention.

Referring jointly to FIGS. 9–10, under a preferred embodiment, the control plane software executes session manager processes and communication processes. The session manager processes include a Proxy Session Manager (PSM) 904 and a Core Session Manager (CSM) 1002. The communication processes include SS7 Message Handler (SS7MsgHdlr) 902a–n and IP Message Handler (IPMsgHdlr) 906a–n. As the names suggest, the session managers include logic for managing and handling call sessions, whereas, the message handlers include logic for handling messages. The message handlers encapsulate the logic for handling messages so that other software does not need to know the message handling particulars. Similarly, the session managers encapsulate the logic for handling sessions, so that other software such as the message handlers do not need to know session state or the like.

The SS7MsgHdlr and IPMsgHdlr processes are responsible for accepting incoming messages and sending outgoing messages. The former accepts and sends signaling messages from and to the MSC 110 and/or the BS 107. The latter SS7MsgHdlr and IPMsgHdlr accepts and sends control messages to the data plane. The PSM process 904 handles all calls or sessions that are "flow through" calls, or non-siphoned calls. The CSM process 1002 handles all the calls or sessions that are being siphoned off by the proxy switch 300. As such, the CSM process 1002 provides much of the same functionality as the circuit-MSC and a BS in the sense that it responds like an MSC to messages from the BS, and responds to messages from the MS as if it were a BS. In general there are multiple PSM and CSM processes running simultaneously on various processor cards to provide the necessary scalability and performance. Additional software processes are provided for failover and reliability. These in our diagrams are referred to as PSM' 904 and CSM' 1002'. The purpose of these "prime" processes is to provide failover for other PSM and CSM processes. In one embodiment, each PSM and CSM has a "shadow" PSM'/CSM' process providing "shadow" coverage. In case a PSM or CSM process fails, the corresponding shadow PSM'/CSM' process is designed to takeover from the failed process.

Referring to FIG. 9, as signaling messages arrive from the BSC and MSC, they are handled by a SS7MsgHdlr 902a–n, which executes on the SS7 processing card. There is one SS7MsgHdlr associated with each signaling link to or from the proxy switch. The SS7 processing cards (mentioned above) extract sufficient information from the signaling message to identify a corresponding SS7MsgHdldlr to which the signaling message is passed.

The SS7MsgHdlr receives the messages and assigns a (preferably) unique logical reference number to this message. This reference number is used later to identify subsequent messages that pertain to the same ongoing call/session. The assigned logical reference number is communicated back to the software system running in the, BS or MSC (e.g., the SCCP protocol stack)which then uses that reference number in all subsequent messages pertaining to this call/session.

After the above processing, the SS7MsgHdlr 902 then selects a PSM 904 to handle the message. In one embodiment, the SS7MsgHdlr examines the point code of the message originator and selects a PSM that is associated with that code. For example, a table may be used to store such relationships.

The PSM 904 then determines if this message is for a call/session that is to be siphoned. In one embodiment, this determination is made by examining the service option field contained in the message that distinguishes between data sessions and voice calls. In another embodiment, this determination is made by examining the calling and called party numbers to ascertain if both are mobile phone numbers. In yet another embodiment, this determination is made by examining the calling party number to determine if the calling party has chosen a VoIP service provider. Once the determination is made to siphon this call/session, the PSM 904 passes the message to the CSM 1002. If a determination is made not to siphon this call/session, the PSM generates a message that is used to send back to the MSC or the BS via the SS7MsgHdlr processes.

The PSM processes 904 may also communicate via an internal protocol to the CSM processes 1002, see, e.g., FIG. 10. The internal protocol of a preferred embodiment is stateless and text based. As stated above, the PSM deals with those sessions/calls that are non-siphonable. Once it encounters a session/call that is siphonable it passes the context of that session/call to a CSM process. The CSM process is responsible for handling all calls/sessions that are siphoned.

The CSM communicates with the Data Plane via standard control protocols such as H.248 and MGCP (Media Gateway Control Protocol).

Figure 11:
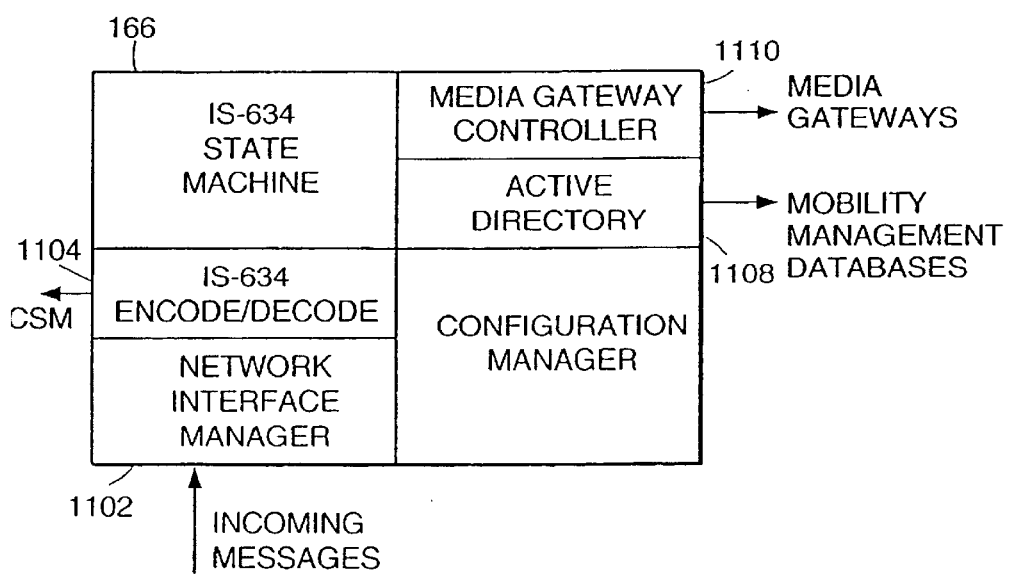
FIG. 11 illustrates software module architecture of certain processes of a proxy switch according to a preferred embodiment of the invention.

The internal architecture of the PSM and CSM processes is similar. Referring to FIG. 11, incoming messages are received by the network interface module 1102. The network interface module then sends the message to the protocol engine 1104. For example, this engine 1104, under CDMA embodiments, is responsible for encoding and decoding messages according to the IS-634 protocol. The state machine module 1106 is responsible for handling the message and recording the state according to the protocol. For example, under a given protocol, a given message signifies a known state transition under that protocol. The state machine module 1106 includes the logic for recording the state and implementing the state transitions.

The active directory module 1108 interacts with the external mobility management functions of the MSC and is responsible for obtaining and updating subscriber profiles and other user/subscriber data. In a traditional MSC, the Visiting Location Register (VLR) is typically co-located with the MSC; the VLR contains the subscriber information (profiles) that are currently roaming within the area covered by the MSC. Additionally, the MSC is connected to another database, called the Home Location Register (HLR) that contains all the subscribers who are "homed" in the current network. Typically, as a subscriber roams and enters an area covered by the MSC, the MSC requests the HLR to send the profile of the subscriber and stores it in the (local) VLR. When the subscriber roams out of the area covered by the MSC (to an area covered by another MSC), this subscriber profile is deleted. The active directory module in the proxy switch acts as a client of the HLR database, requests subscriber profiles from the HLR for subscribers who roam into the area covered by the proxy switch, and updates the local database, i.e., the active directory module and its associated database act/behave as a traditional VLR for roaming subscribers.)

The media gateway controller (MGC) module 1110 interacts with the data plane 304 of the proxy switch via open control protocols, such as H.248 and MGCP. Upon receiving an action request from the IS-634 state machine module 1106, the MGC 1110 sends a message in H.248 or MGCP protocol to the data plane 304 to carry out the needed actions. In one embodiment, the so-called TDM-VoIP case, these action messages from the MGC 1110 to the data plane instruct the data plane to receive incoming circuit (TDM) traffic at an ingress port and to convert it into RTP/UDP/IP packets and send it out from one of the egress ports. Thus, in this embodiment, incoming circuit traffic is packetized and sent out as packets. This embodiment could be used for taking circuit calls, and transporting them as Voice over IP (VoIP) calls. In another embodiment, the so-called TDM-TDM case, the MGC 1110 instructs the data plane 304 to receive incoming circuit (TDM) traffic at an ingress port and switch as circuit (TDM) traffic out of an egress port. In this case, incoming circuit traffic is preserved as circuit and switched to an alternative circuit network.

Figure 13:
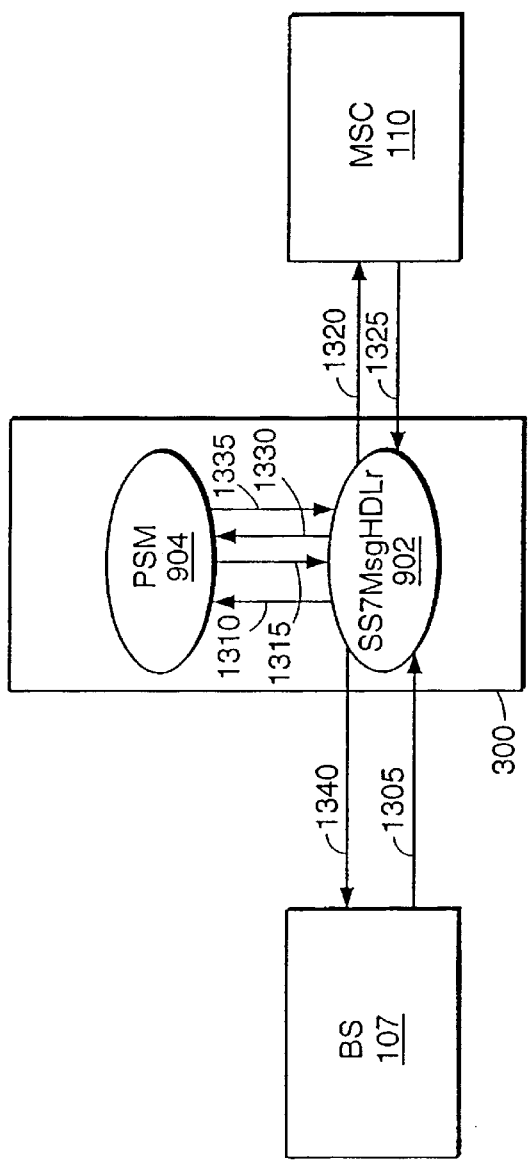
FIGS. 12–14 are simplified architectural diagrams to show message flow and software process interaction.
Figure 12:
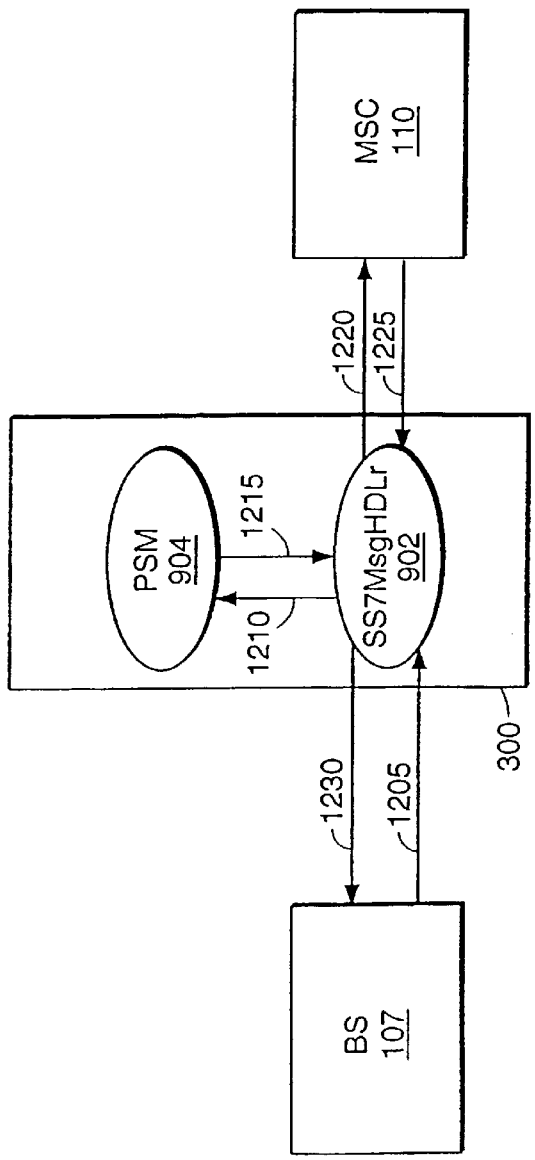
Figure 14:
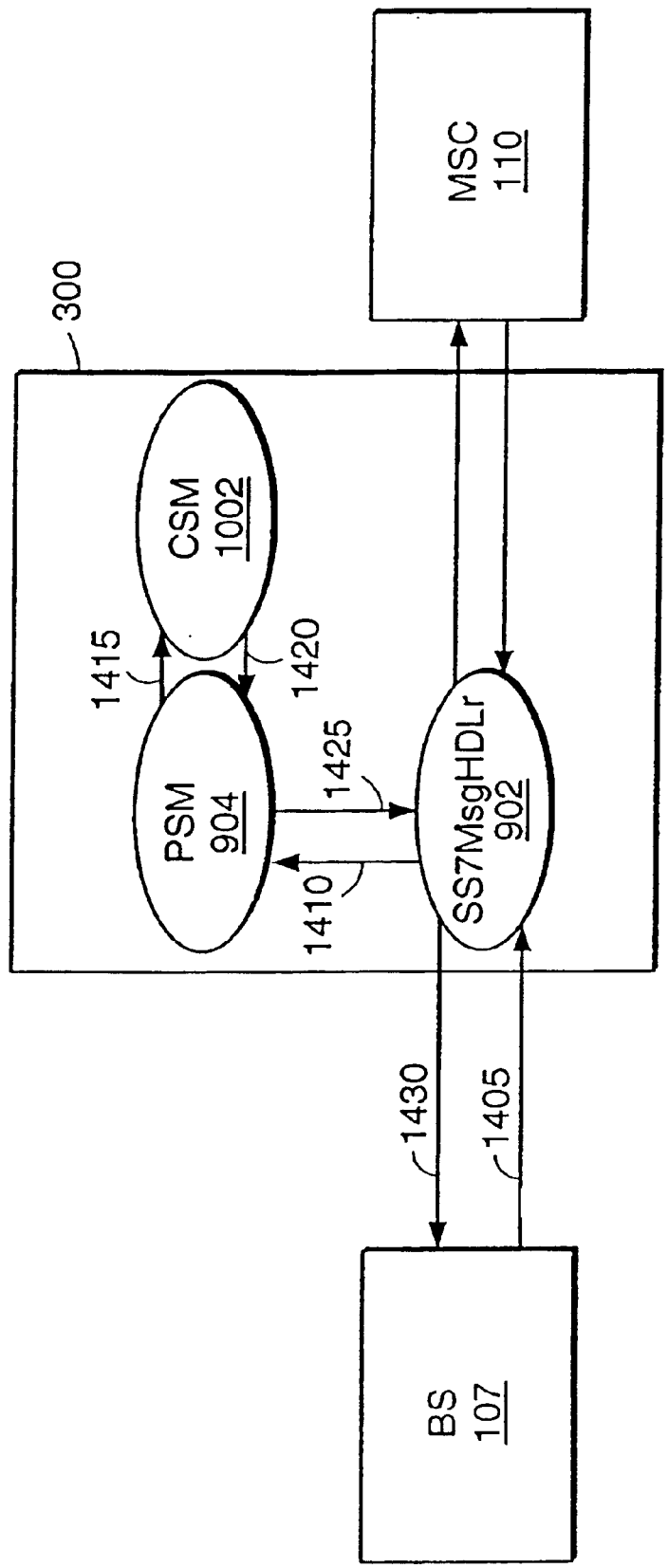

FIGS. 12–14 are used to illustrate the above concepts with simplified architectural diagrams. The figures are used to show the various interactions of the software processes in response to signaling messages. Bearer circuits are excluded from some of the figures for the sake of simplicity. Moreover, only single instances of the PSM and CSM processes are shown for the sake of simplicity.

FIG. 12 is used to show the control flow when a new call message is initiated from the BS 107 to the MSC 110, and to show a "Pass through call." A pass through call is a call in which the proxy switch 300 is not responsible for managing the call and in which the call is to be passed through for handling by the MSC 110. The proxy switch 300 is transparent for purposes of this call (though it may alter point codes, for example, to handle re-mapping of MSCs as explained with reference to FIG. 3B). The BS 107 sends 1205 a service request (such as a CSR) which is intended for the MSC 110. The service request contains a service option field that specifies whether this is a request for a voice call or a data call. The proxy switch receives this message (since it is in the signaling path between the BSC and the MSC); in particular, the SS7MsgHdlr process 902 receives the call, assigns a unique local reference number to this message (this is the initial message for a potentially ongoing call request), and routes 1210 it to the PSM process 904 for further processing. The PSM process 904 decodes the incoming message and using the IS-634 state machine (for CDMA embodiments) determines whether this call is to be siphoned (e.g., to an alternative network) or allowed to be handled by the MSC 110. Since in this example the call is not to be siphoned, the message is encoded and sent back 1215 to the SS7MsgHdlr process 902. In one embodiment, the comminication protocol between the SS7MsgHdlr and PSM processes is a stateless text-based protocol that provides a level of abstraction (relative to session logic) of the underlying signaling protocol. The SS7MsgHdlr process 902 then re-transmits 1220 the IS-634 message to the MSC 110. The MSC processes this message and responds 1225. This response is also received by the proxy switch 300 but since this response is related to an on-going but non-siphonable call (as determined from the local reference number assigned to the initial CSR request message explained above), the SS7MsgHdlr process 902 does not forward this message to the PSM 904. Instead, the SS7MsgHdlr sends 1230 this message transparently onward to the BS 107. All further exchanges relating to this call are allowed to transparently pass between the BS and the MSC except for a Call Release message at the conclusion of the call. In response to a Call Release, the proxy switch 300 ensures that the "ear down" of the call happens including the disposition of the local reference number. The call release message is also sent to the BS 107 by the proxy switch so that the BS can proceed with its tear down processes.

FIG. 13 is used to show the case of a call message initiated by the BS 107 to the MSC 110 and also used to show proxy trunks, i.e., trunks that are controlled and assigned by the MSC 110. The BS 107 sends 1305 a service request intended for the MSC 110. The proxy switch receives this message and the SS7MsgHdlr process 902 receives the call, assigns a unique local reference number to this message, and routes 1310 it to the PSM process 904 for further processing. The PSM process 904 decodes the incoming message and determines whether this call is to be siphoned (e.g., to an alternative network) or allowed to be handled by the MSC 110. Since in this example the call is not to be siphoned, the message is encoded and sent back 1315 to the SS7MsgHdlr process 902. The SS7MsgHdlr process 902 then re-transmits 1320 the message to the MSC 110. The MSC 110 responds 1325 to the call set up request by assigning a channel to the call (as described above). This channel assignment is received by the proxy switch 300 which passes 1330 the assignment to the PSM 904, which in turn responds 1335 that is has recorded this assignment 1330. The proxy switch then transmits 1340 the channel assignment request onwards to the BS 107. All further exchanges relating to this call between the BSC and the MSC are allowed to transparently pass through the proxy switch until the call release message. The call release triggers the tear down processes in the proxy switch.

FIG. 14 is used to show the case of a "siphoned call." A siphoned call is a call initiated by the BS 107 that is intercepted and re-directed to an alternative network by the proxy switch. In such an example, all signaling is to be handled by the proxy switch and the trunks carrying user traffic are to be controlled by the proxy switch. The BS 107 sends 1405 a service request intended for the MSC 10. The proxy switch receives this message and assigns a unique local reference number to this message, and routes 1410 it to the PSM process 904 for further processing. The PSM process 904 decodes the incoming message and using the IS-634 state machine (for CDMA embodiments) determines that the call is to siphoned. Since in this example the call is to be siphoned to an alternative network, the PSM transmits 1415 the message to the CSM process 1002. The CSM process 1002 now starts to behave like a conventional MSC and issues 1420 a channel assignment for this call, assigning a trunk between the BS and the data plane of the proxy switch. The channel assignment is then sent 1435 to the SS7MsgHdlr. The SS7MsgHdlr process transmits 1430 this channel assignment information to the BS so that the BS may use it for user traffic. The CSM also sends a message to the data plane of the proxy switch (as described above using H.248 or MGCP protocols) directing it to receive incoming user traffic on the assigned channel and directing it to an alternative network. As explained above, in one embodiment the alternative network may be an IP network. All further exchanges occur between the BSC and CSM process until the call release command is issued by the MSC causing a release of resources (the tear down process).

In another embodiment, the software architecture may use only a single process for carrying out the proxy functions rather than using two different processes (PSM and CSM). In such an embodiment, the PSM process alone determines, as before, if a call is to be siphoned or not. If it is not a siphonable call, it is allowed to proceed to the MSC. If it is a siphonable call, the PSM itself handles the call and sends and accepts messages from the BS 107 and the MSC 110. In other words, the PSM in such an embodiment acts like an MSC and BS 107 and handles all the signaling messages in this regard. As such, the PSM process provides much of the same functionality as the circuit-MSC and a BS 107 in the sense that it responds like an MSC to messages from the BS 107, and responds to messages from the MS as if it were a BS 107. In general there are multiple PSM processes running simultaneously on various processor cards to provide the necessary scalability and performance. Additional software processes are provided for failover and reliability. The purpose of these processes is to provide failover for other PSM processes. In one embodiment, each PSM has a "shadow" process providing "shadow" coverage. In case a PSM process fails, the corresponding shadow process is designed to takeover from the failed process.

Variations

The above embodiments all facilitate the realization of a transparent switch. Subsets of the functionality, however, still provide advantages over the state of the art. For example, a switch that is partly visible to the network may still offer many of the advantages discussed above.

In addition, the embodiments were described in part with relation to CDMA protocols, but the embodiments may also be modified to work with GSM, IS-136 and/or other2G and 3G protocols.

The connection of trunks from proxy switch to MSC is optional.

Having described an exemplary embodiment, it should be apparent to persons of ordinary skill in the art that changes may be made to the embodiment described without departing from the spirit and scope of the invention.

What is claimed is:

1. A method of re-directing communication to an alternative communications network from a mobile communications network having at least one base station subsystem (BS), at least one mobile station (MS), at least one mobile switching center (MSC), and at least one switch in communication with at least one of the base station subsystems, the at least one of the MSCs, and the alternative communications network, the method comprising the acts of:

the switch sending and receiving signaling messages to and from the MSC on a first signaling link and sending and receiving messages to and from the BS on a second signaling link; wherein the second link has a mapped correspondence to the first link;

the switch detecting whether a received message is a change over order message (COO) from the MSC, indicating that the MSC will not receive signaling messages on the first signaling link the switch generating and sending a change over acknowledge (COA) message to the MSC;

after the act of detecting the COO, the switch receiving signaling messages on the second signaling link and providing control information contained therein to the alternative communication network; and after the act of detecting the COO, the switch receiving information from a bearer circuit corresponding to the second signaling link and directing the information to the alternative communication network.

2. The method of claim 1 wherein the acts of providing control information to the alternative network and of directing the information in the bearer circuit to the alternative network is performed after the act of detecting the COO and at a call session boundary.

3. The method of claim 1 further comprising the acts of:

the switch detecting whether a received message is a change over order message (COO) from the MSC, indicating that the first signaling link can again receive signaling messages;

the switch generating and sending a COO message to the BS in which the COO;

the switch receiving a COA message from the BS;

the switch generating and sending a COA message to the MSC; and the switch de-establishing communication between the bearer circuit and the alternative communication network.

4. A proxy switch for use in a mobile communications network having at least one mobile switching center (MSC) and at least one base station subsystem (BS), wherein the MSC and BS each communicate signaling messages according to a mobile signaling protocol and wherein the BS is in communication with the proxy switch via at least one bearer circuit, and wherein the proxy switch is in communication with an alternative communication network, the proxy switch comprising:

signaling message handling logic for sending and receiving signaling messages to and from the MSC on a first signaling link and sending and receiving messages to and from the BS on a second signaling link; wherein the second link has a mapped correspondence to the first link;

message interception logic, cooperating with the signaling message handling logic, for detecting whether a signaling message from an MSC is a change over order message (COO) indicating that the MSC will not receive signaling messages on the first signaling link, and for preventing the COO from being forwarded to the BS and for generating and sending a change over acknowledge (COA) message to the MSC;

signaling message redirection logic, cooperating with the message interception logic, for receiving signaling messages on the second signaling link and providing control information contained therein to the alternative communication network after the message interception logic detects the COO; and bearer circuit redirection logic for receiving information from a bearer circuit corresponding to the second signaling link and directing the information to the alternative communication network.

5. The proxy switch of claim 4 further comprising state logic for maintaing session state information of calls and wherein signaling message redirection logic and the bearer circuit redirection logic cooperate with the state logic to provide control information and direct bearer circuit information to the alternative network after a call session boundary.

* * * * *